US012591721B2

(12) United States Patent
Wang

(10) Patent No.: US 12,591,721 B2
(45) Date of Patent: Mar. 31, 2026

(54) METHOD AND NUMERICAL THREE-DIMENSIONAL MODEL TO SIMULATE DAM BREACH FOR HOMOGENEOUS AND ZONED SOIL DAMS

(71) Applicant: Zhengang Wang, Herndon, VA (US)

(72) Inventor: Zhengang Wang, Herndon, VA (US)

( * ) Notice: Subject to any disclaimer, the term of this patent is extended or adjusted under 35 U.S.C. 154(b) by 896 days.

(21) Appl. No.: 17/820,630

(22) Filed: Aug. 18, 2022

(65) Prior Publication Data

US 2024/0061970 A1     Feb. 22, 2024

(51) Int. Cl.
*G06F 30/20*      (2020.01)
*G06F 113/08*     (2020.01)
*G06F 111/10*     (2020.01)

(52) U.S. Cl.
CPC .......... *G06F 30/20* (2020.01); *G06F 2111/10* (2020.01); *G06F 2113/08* (2020.01)

(58) Field of Classification Search
CPC ... G06F 30/20; G06F 2111/10; G06F 2113/08
See application file for complete search history.

(56) References Cited

PUBLICATIONS

Talukdar, Priyanka, and Arindam Dey. "Hydraulic failures of earthen dams and embankments." Innovative Infrastructure Solutions 4.1 (2019): 42. (Year: 2019).*
M. W. Morris "Recent Improvements in Predicting Breach through Flood Embankments and Embankment Dams", Dams: Engineering in a Social & Environmental Context. Thomas Telford, London, 2012 (Year: 2012).*

* cited by examiner

*Primary Examiner* — Chuen-Meei Gan

(57)      ABSTRACT

Disclosed are method and a numerical three-dimensional dam breach model that calculate the dam break hydrograph for a homogeneous or zoned soil dam along with the visualized three-dimensional dam-breaching process and removed soil graph, wherein the failure mode can be over-topping failure, wind-generated wave overtopping failure, piping failure, or static liquefaction failure; wherein the dam can be breached at one location or multiple locations; and wherein elevations of the dam's crests and bottoms and soil properties at all stations along the dam's centerline are modeled. The topographic information surrounding the dam is pulled out from USGS DEM as a domain of the outer two-dimensional Shallow Water Equations grids that controls the hydraulic boundary conditions. Clear water scouring to different soils with different construction compaction efforts are calculated using corresponding erosion formulae. Force/moment equilibrium of soil blocks is analyzed, and instable soil blocks are removed.

1 Claim, 35 Drawing Sheets

The simulated failure of South Fork Dam in Pennsylvania in 1889, modeled as a homogeneous cohesive soil dam

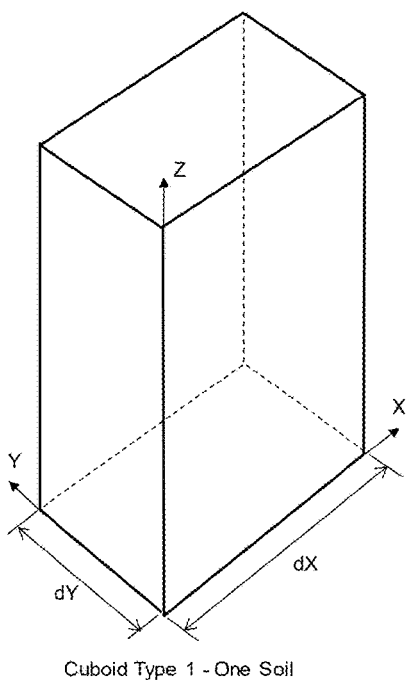
Cuboid Type 1 - One Soil
FIG. 1A - Cuboid Type 1, basic cuboid with one soil
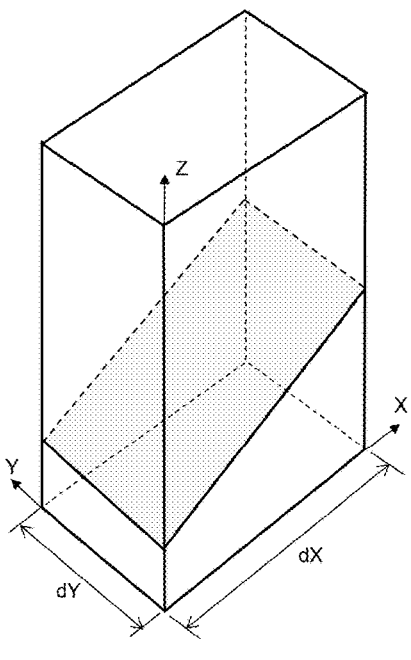
Cuboid Type 2 - Two Soils
FIG. 1B - Cuboid Type 2, basic cuboid with two soils, with one soil on top and another soil on bottom

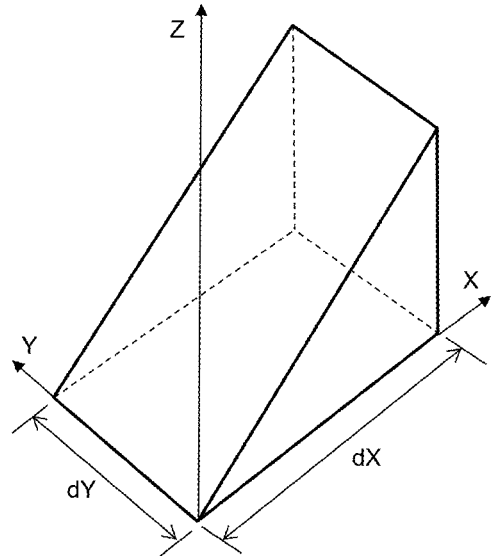
Cuboid Type 3 - One Soil, Upstream Toe
FIG. 1C - Cuboid Type 3, basic cuboid at upstream toe
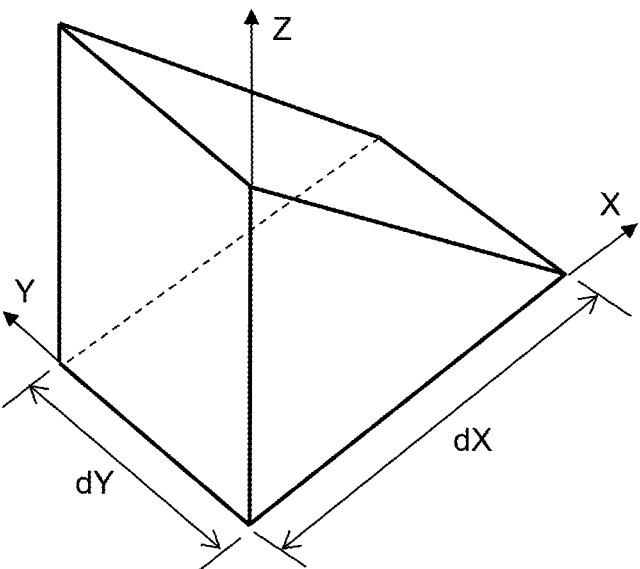
Cuboid Type 4 - One Soil, Downstream Toe
FIG. 1D - Cuboid Type 4, basic cuboid at downstream toe

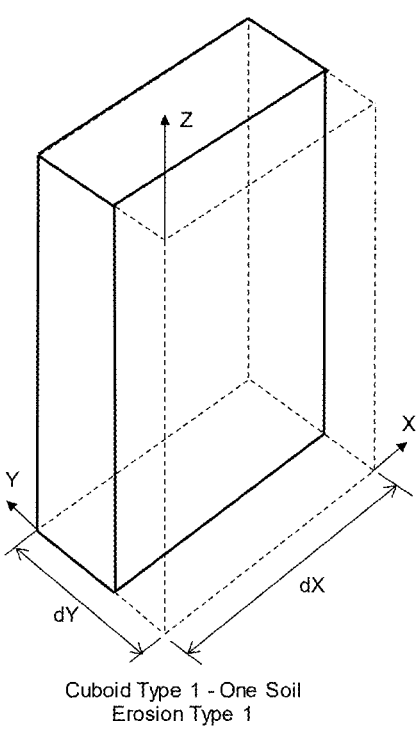
Cuboid Type 1 - One Soil
Erosion Type 1
FIG. 2A - Cuboid Type 1, Erosion Type 1, left side of a breach channel
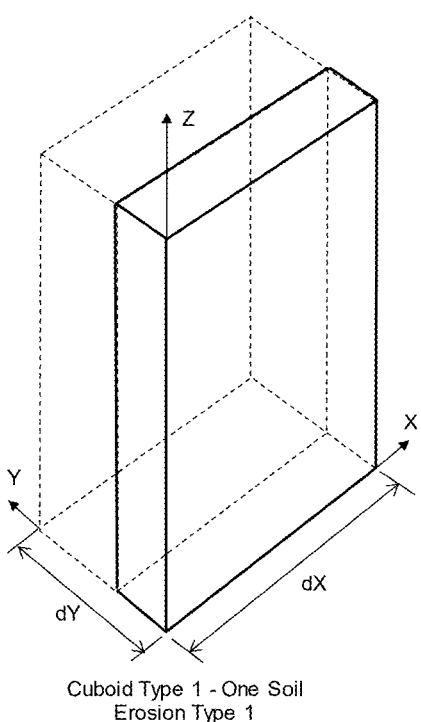
Cuboid Type 1 - One Soil
Erosion Type 1
FIG. 2B - Cuboid Type 1, Erosion Type 1, right side of a breach channel

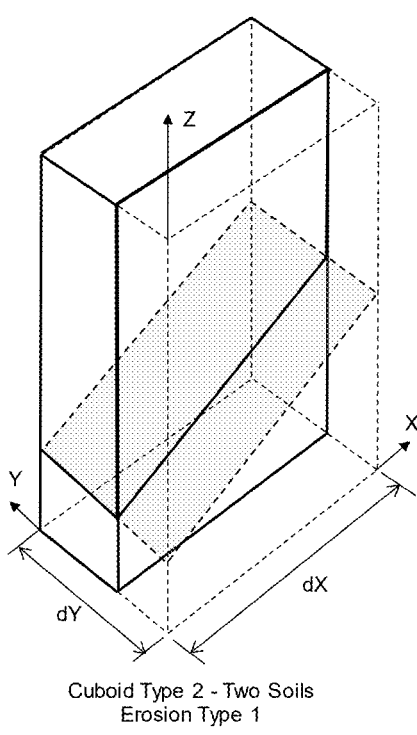
Cuboid Type 2 - Two Soils
Erosion Type 1
FIG. 2C - Cuboid Type 2, Erosion Type 1, left side of a breach channel
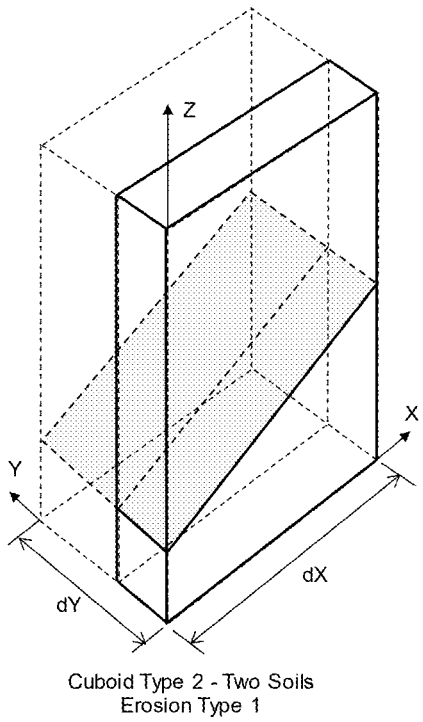
Cuboid Type 2 - Two Soils
Erosion Type 1
FIG. 2D - Cuboid Type 2, Erosion Type 1, right side of a breach channel

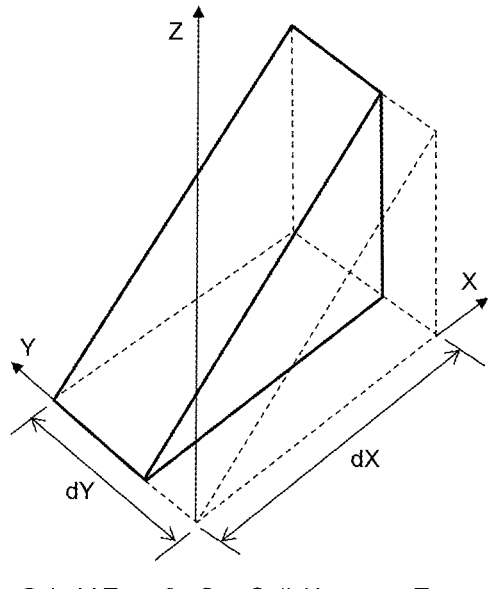
Cuboid Type 3 - One Soil, Upstream Toe
Erosion Type 1
FIG. 2E - Cuboid Type 3, Erosion Type 1, left side of a breach channel
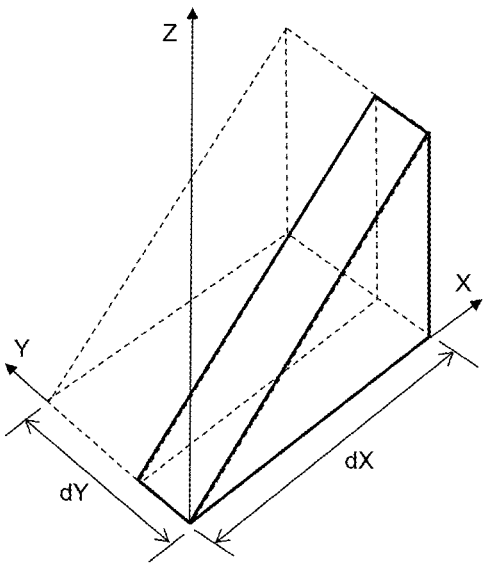
Cuboid Type 3 - One Soil, Upstream Toe
Erosion Type 1
FIG. 2F - Cuboid Type 3, Erosion Type 1, right side of a breach channel

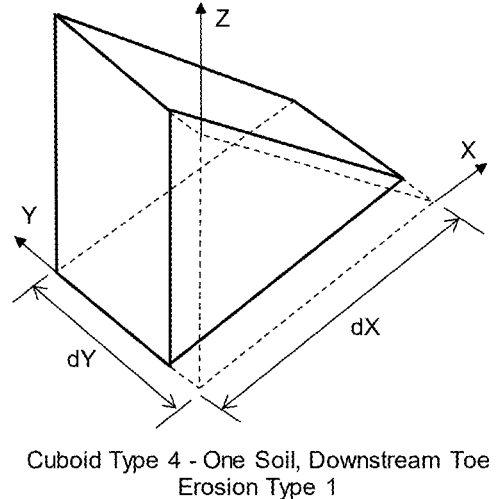
Cuboid Type 4 - One Soil, Downstream Toe
Erosion Type 1
FIG. 2G - Cuboid Type 4, Erosion Type 1, left side of a breach channel
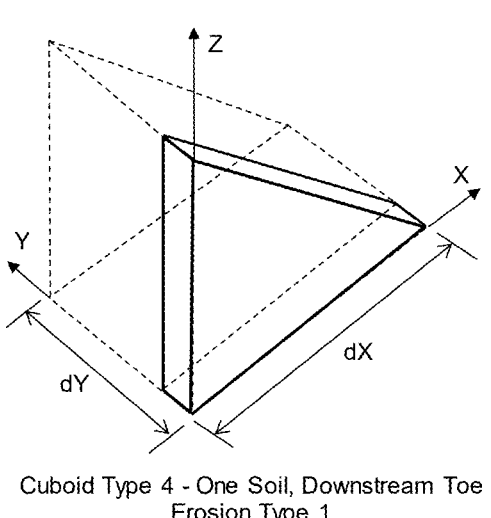
Cuboid Type 4 - One Soil, Downstream Toe
Erosion Type 1
FIG. 2H - Cuboid Type 4, Erosion Type 1, right side of a breach channel

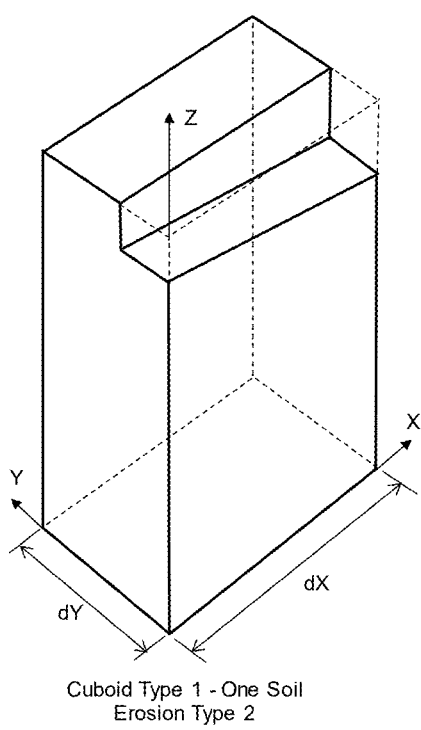
Cuboid Type 1 - One Soil
Erosion Type 2
FIG. 3A - Cuboid Type 1, Erosion Type 2, left side of a breach channel
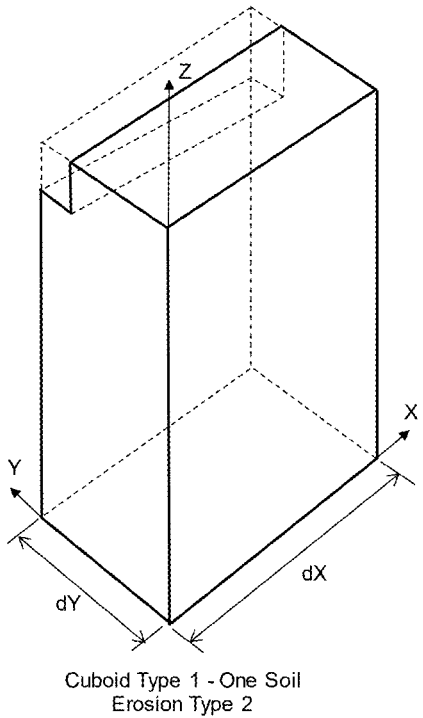
Cuboid Type 1 - One Soil
Erosion Type 2
FIG. 3B - Cuboid Type 1, Erosion Type 2, right side of a breach channel

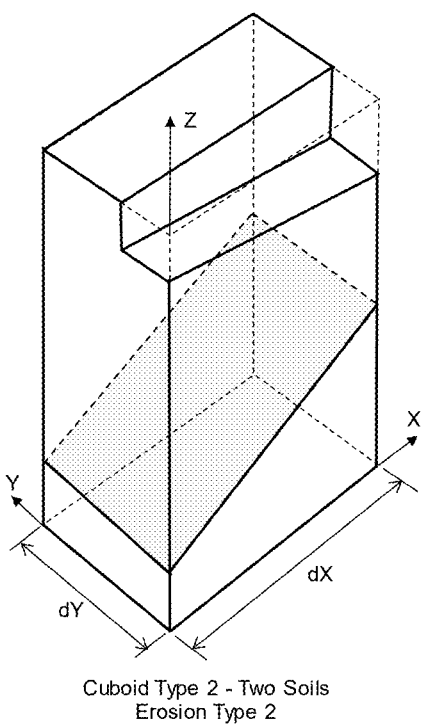
Cuboid Type 2 - Two Soils
Erosion Type 2
FIG. 3C - Cuboid Type 2, Erosion Type 2, left side of a breach channel
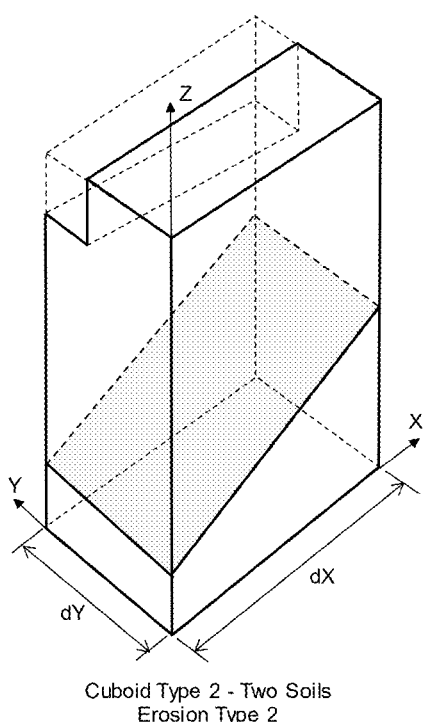
Cuboid Type 2 - Two Soils
Erosion Type 2
FIG. 3D - Cuboid Type 2, Erosion Type 2, right side of a breach channel

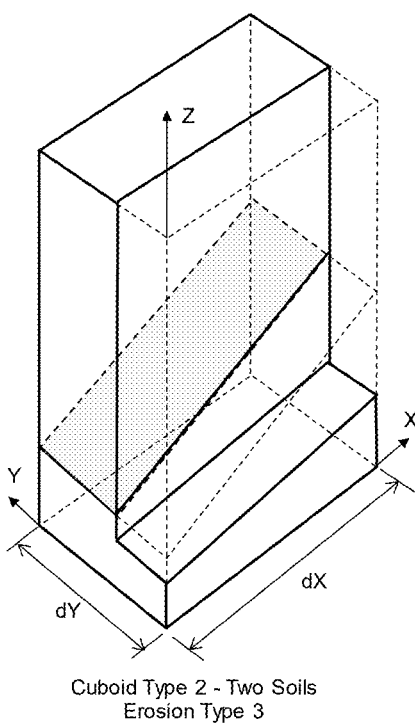
Cuboid Type 2 - Two Soils
Erosion Type 3
FIG. 4A - Cuboid Type 2, Erosion Type 3, left side of a breach channel
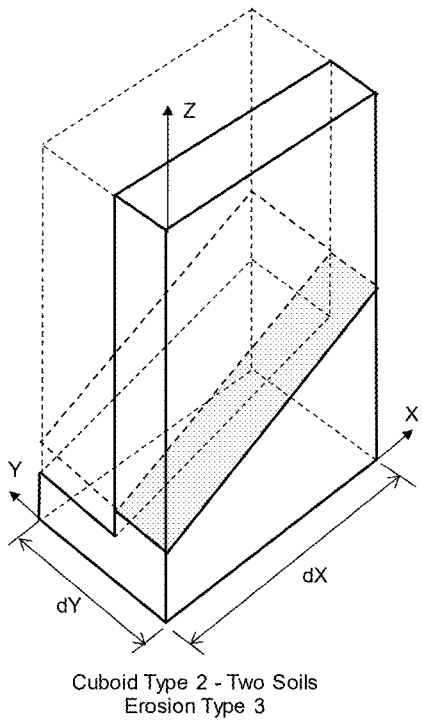
Cuboid Type 2 - Two Soils
Erosion Type 3
FIG. 4B - Cuboid Type 2, Erosion Type 3, right side of a breach channel

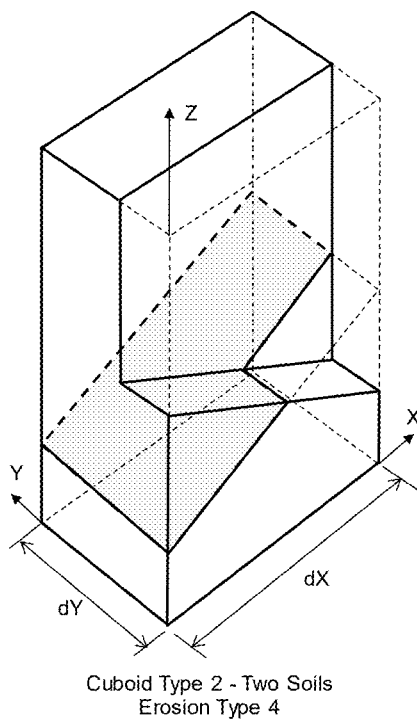
Cuboid Type 2 - Two Soils
Erosion Type 4
FIG. 4C - Cuboid Type 2, Erosion Type 4, left side of a breach channel
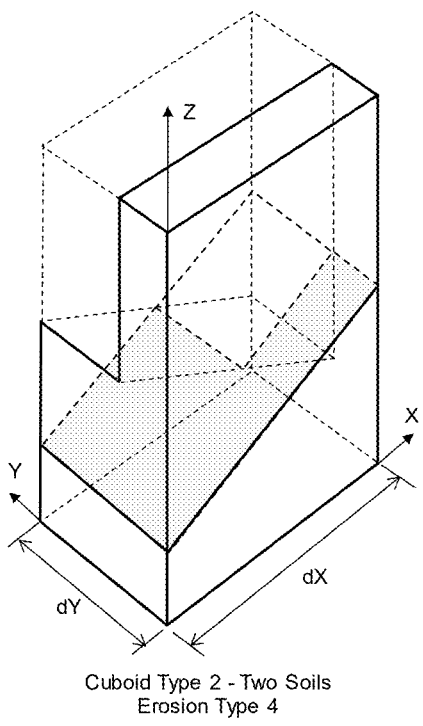
Cuboid Type 2 - Two Soils
Erosion Type 4
FIG. 4D - Cuboid Type 2, Erosion Type 4, right side of a breach channel

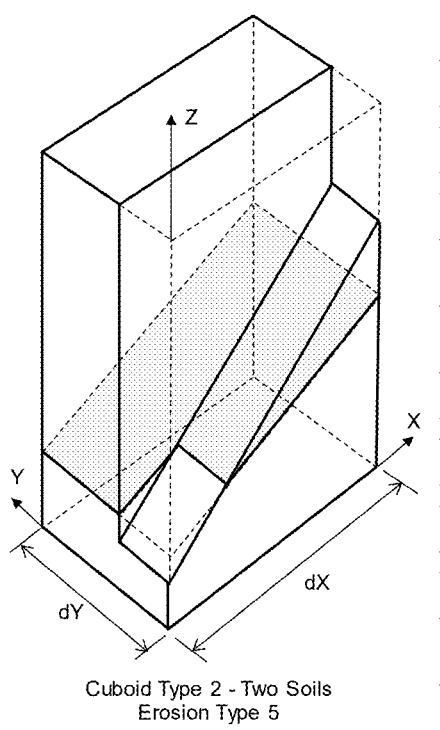
Cuboid Type 2 - Two Soils
Erosion Type 5
FIG. 4E - Cuboid Type 2, Erosion Type 5, left side of a breach channel
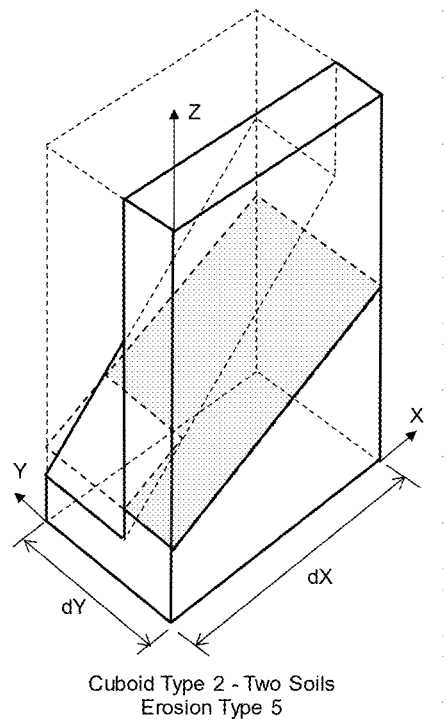
Cuboid Type 2 - Two Soils
Erosion Type 5
FIG. 4F - Cuboid Type 2, Erosion Type 5, right side of a breach channel

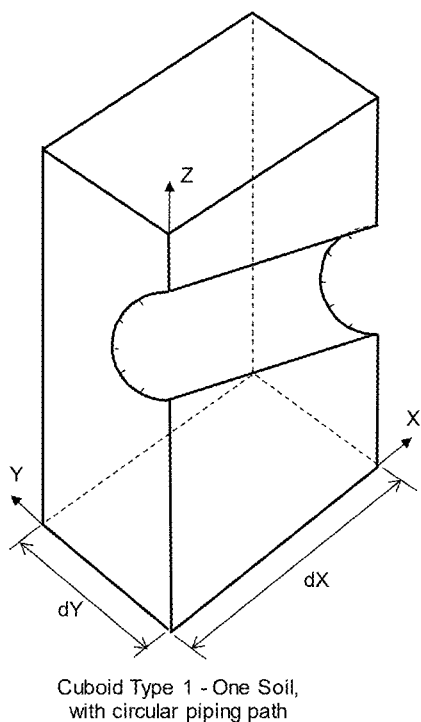
Cuboid Type 1 - One Soil,
with circular piping path
FIG. 5A - Cuboid Type 1, with a circular piping path, left side of a breach channel
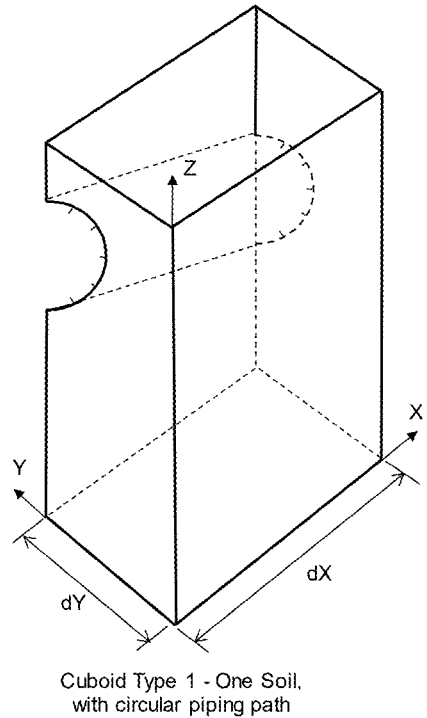
Cuboid Type 1 - One Soil,
with circular piping path
FIG. 5B - Cuboid Type 1, with a circular piping path, right side of a breach channel

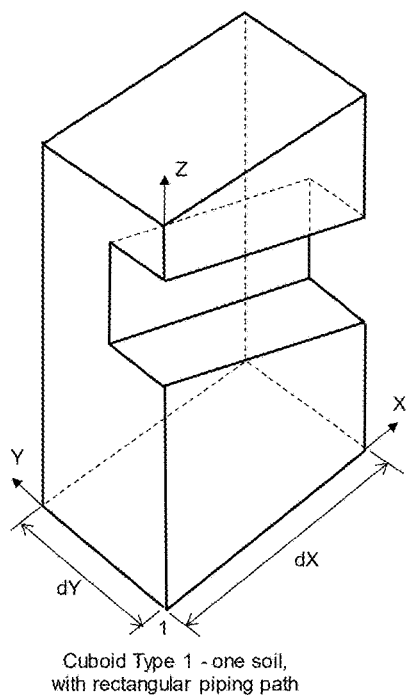
Cuboid Type 1 - one soil,
with rectangular piping path
FIG. 5C - Cuboid Type 1, with a rectangular piping path, left side of a breach channel
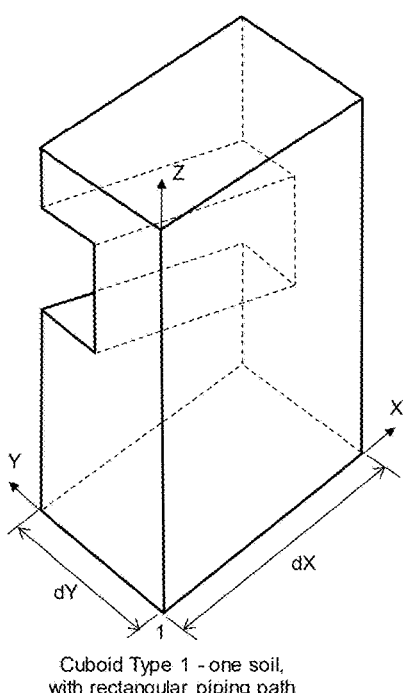
Cuboid Type 1 - one soil,
with rectangular piping path
FIG. 5D - Cuboid Type 1, with a rectangular piping path, right side of a breach channel

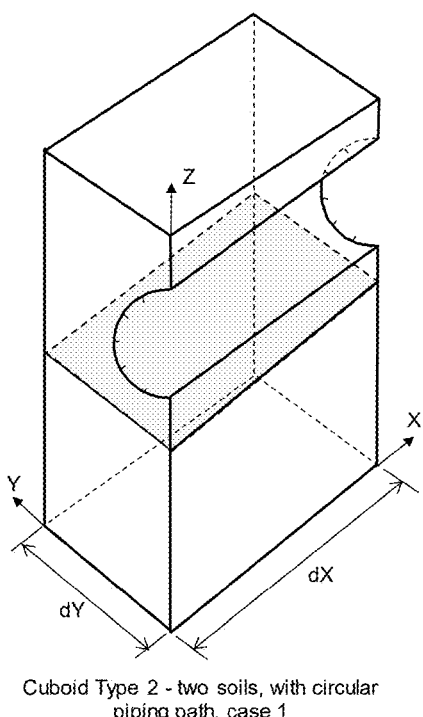
Cuboid Type 2 - two soils, with circular
piping path, case 1
FIG. 6A - Cuboid Type 2, Case 1, with a circular piping path, left side of a breach channel
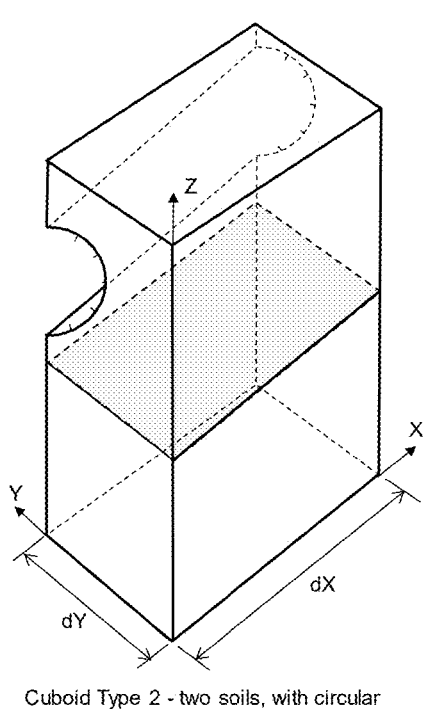
Cuboid Type 2 - two soils, with circular
piping path, case 1
FIG. 6B - Cuboid Type 2, Case 1, with a circular piping path, right side of a breach channel

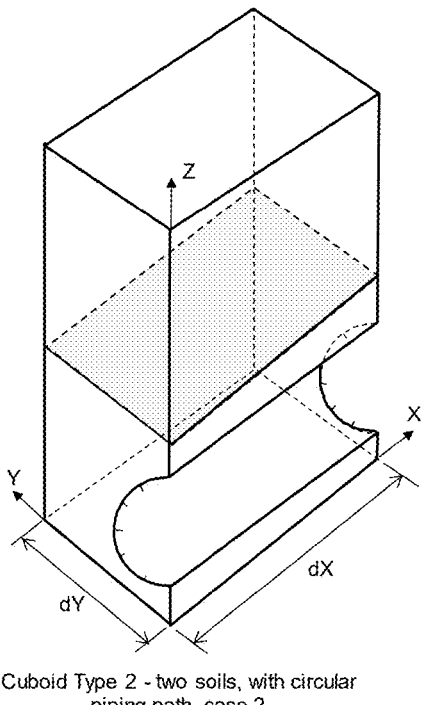
Cuboid Type 2 - two soils, with circular
piping path, case 2
FIG. 6C - Cuboid Type 2, Case 2, with a circular piping path, left side of a breach channel
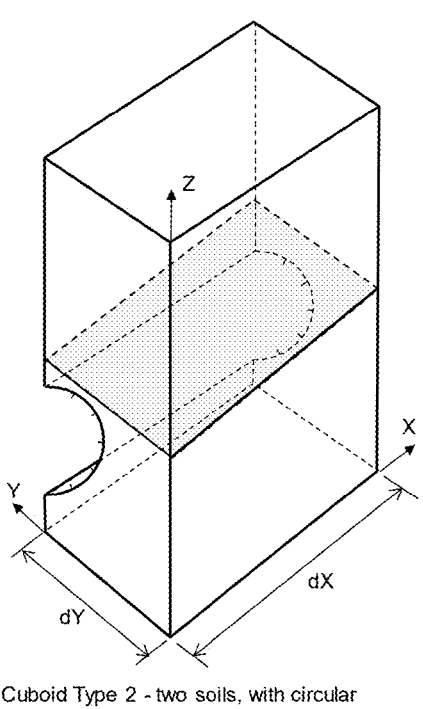
Cuboid Type 2 - two soils, with circular
piping path, case 2
FIG. 6D - Cuboid Type 2, Case 2, with a circular piping path, right side of a breach channel

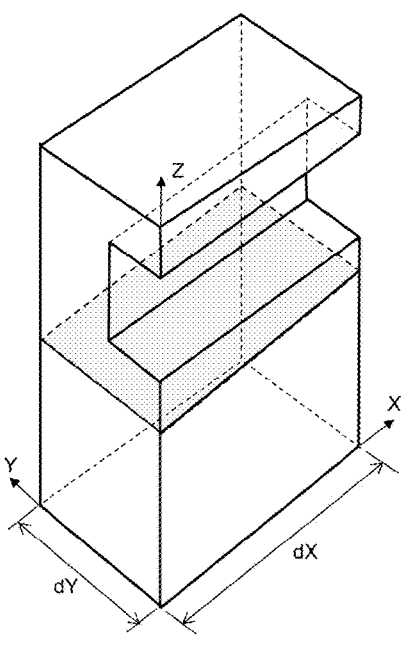
Cuboid Type 2 - Two Soils, with rectangular
piping path, case 1
FIG. 7A - Cuboid Type 2, Case 1, with a rectangular piping path, left side of a breach channel
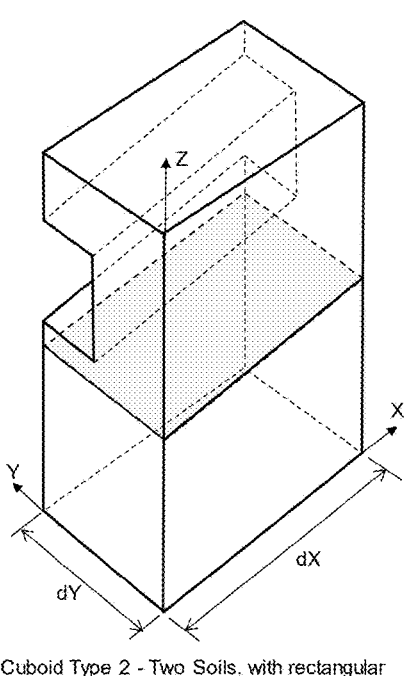
Cuboid Type 2 - Two Soils, with rectangular
piping path, case 1
FIG. 7B - Cuboid Type 2, Case 1, with a rectangular piping path, right side of a breach channel

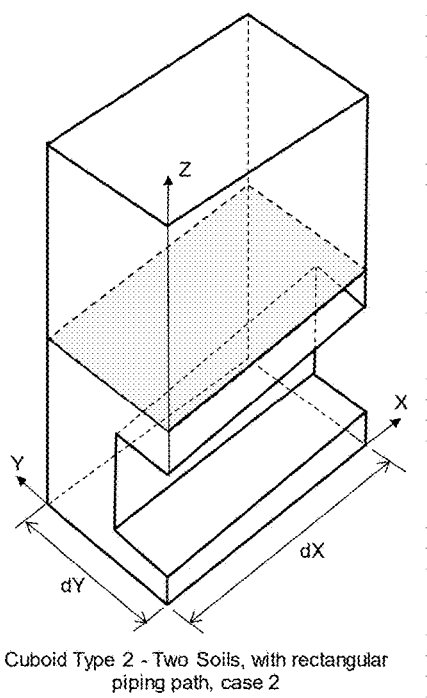
Cuboid Type 2 - Two Soils, with rectangular
piping path, case 2
FIG. 7C - Cuboid Type 2, Case 2, with a rectangular piping path, left side of a breach channel
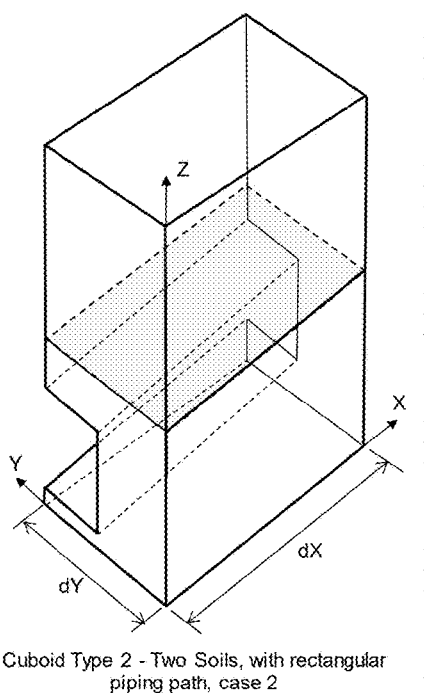
Cuboid Type 2 - Two Soils, with rectangular
piping path, case 2
FIG. 7D - Cuboid Type 2, Case 2, with a rectangular piping path, right side of a breach channel

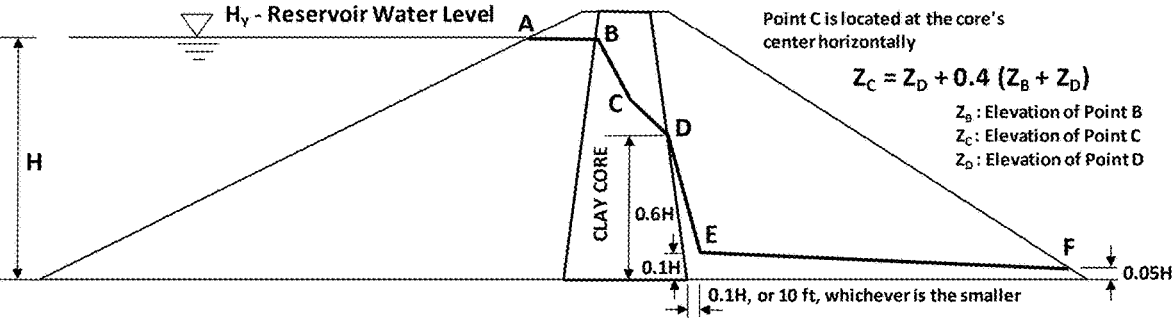
FIG. 8A - Default phreatic surface defined by lines A-B-C-D-E-F in zoned dams with a clay core
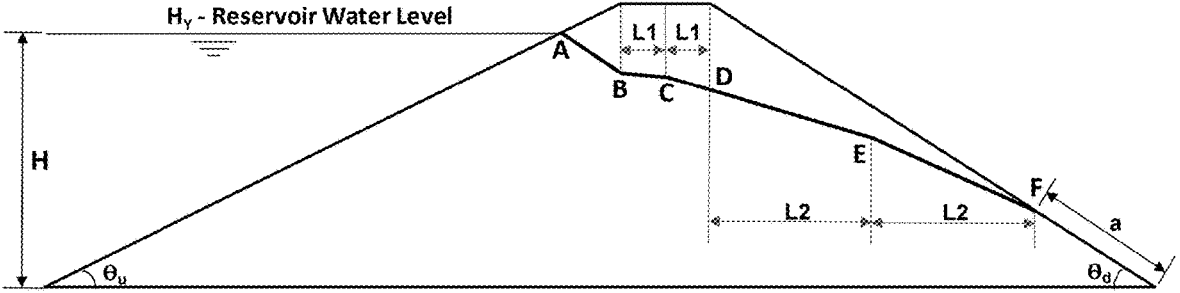
FIG. 8B - Default phreatic surface defined by lines A-B-C-D-E-F in homogeneous dams

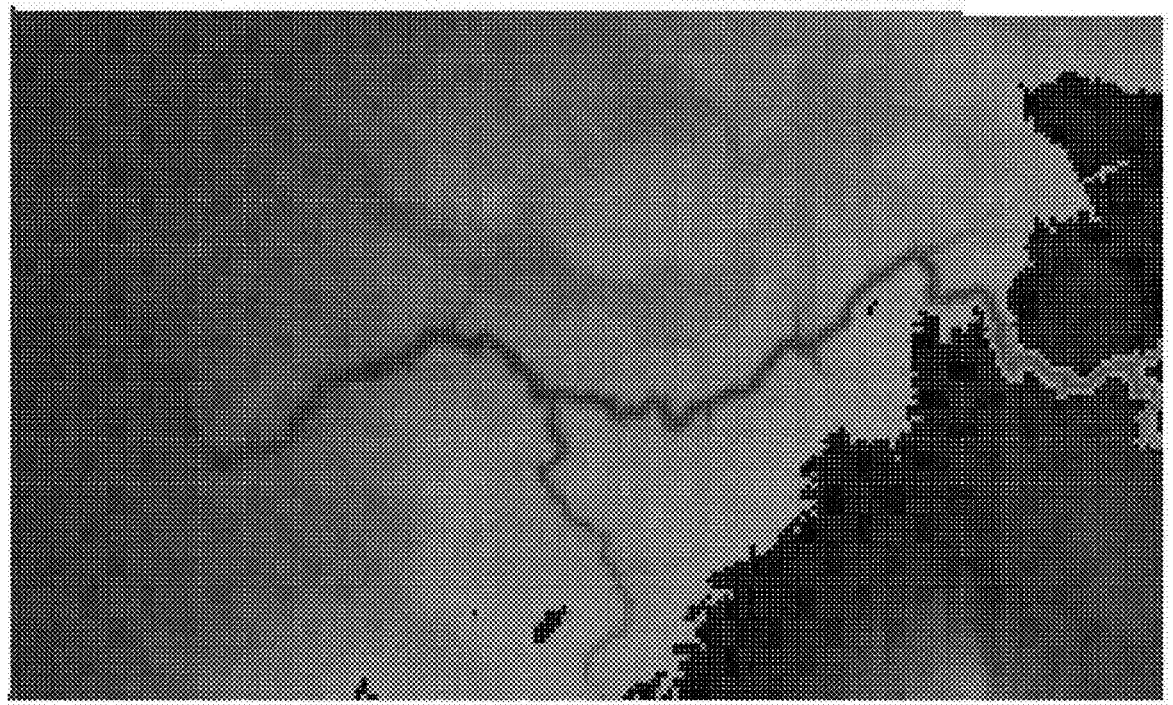
FIG. 9A – A smaller DEM, clipped from USGS DEM, converted to UTM in meters and
shown by this model Input Dialog - CLIP DEM

Figure 9B:
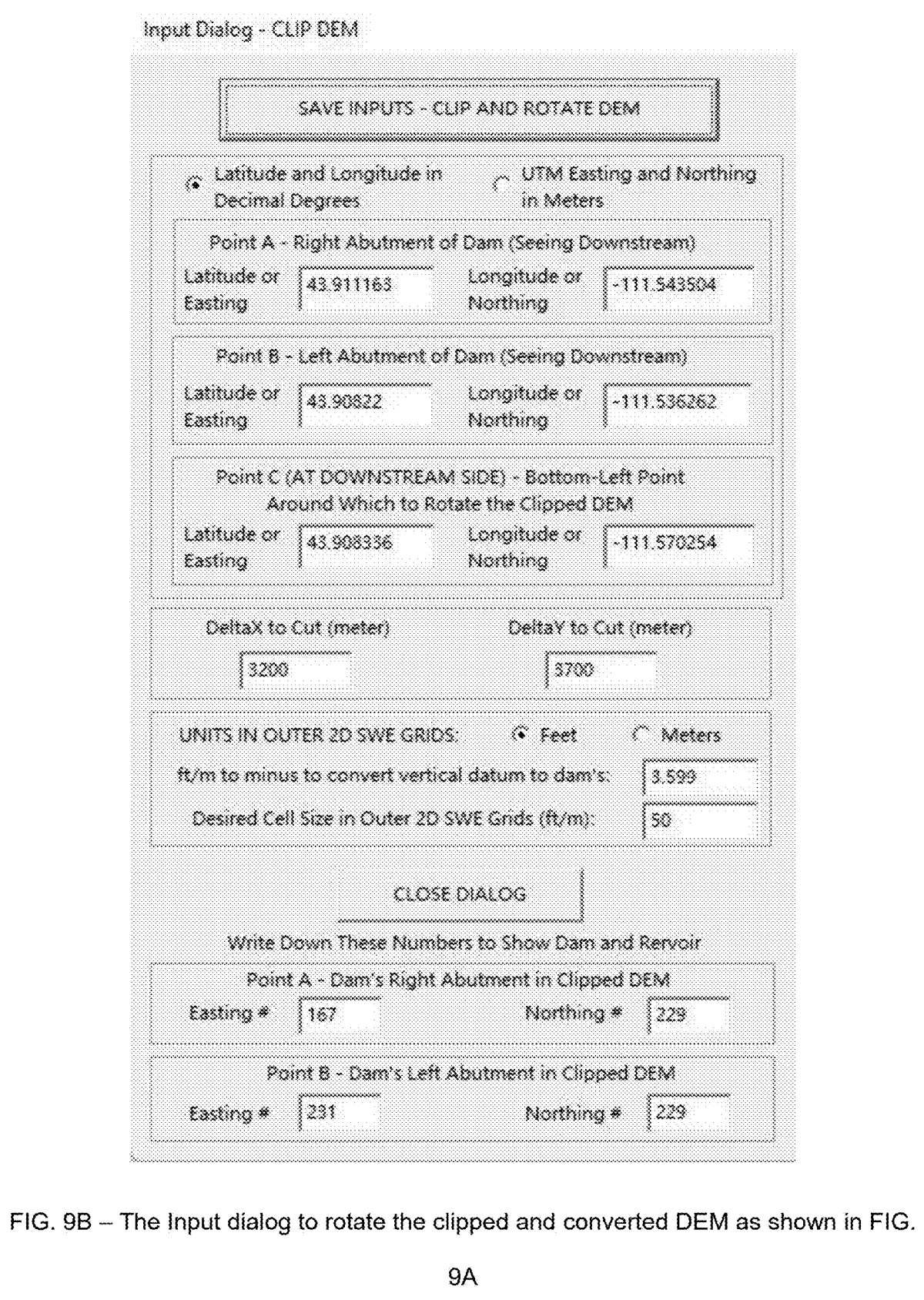

| SAVE INPUTS - CLIP AND ROTATE DEM |
|---|

⊙ Latitude and Longitude in Decimal Degrees      ○ UTM Easting and Northing in Meters

Point A - Right Abutment of Dam (Seeing Downstream)

Latitude or Easting: 43.911163      Longitude or Northing: -111.543504

Point B - Left Abutment of Dam (Seeing Downstream)

Latitude or Easting: 43.90822      Longitude or Northing: -111.536262

Point C (AT DOWNSTREAM SIDE) - Bottom-Left Point Around Which to Rotate the Clipped DEM

Latitude or Easting: 43.908336      Longitude or Northing: -111.570254

DeltaX to Cut (meter): 3200      DeltaY to Cut (meter): 3700

UNITS IN OUTER 2D SWE GRIDS:      ⊙ Feet      ○ Meters ft/m to minus to convert vertical datum to dam's: 3.599

Desired Cell Size in Outer 2D SWE Grids (ft/m): 50

| CLOSE DIALOG |
|---|

Write Down These Numbers to Show Dam and Rervoir

Point A - Dam's Right Abutment in Clipped DEM

Easting #: 167      Northing #: 229

Point B - Dam's Left Abutment in Clipped DEM

Easting #: 231      Northing #: 229

FIG. 9B – The Input dialog to rotate the clipped and converted DEM as shown in FIG.

9A

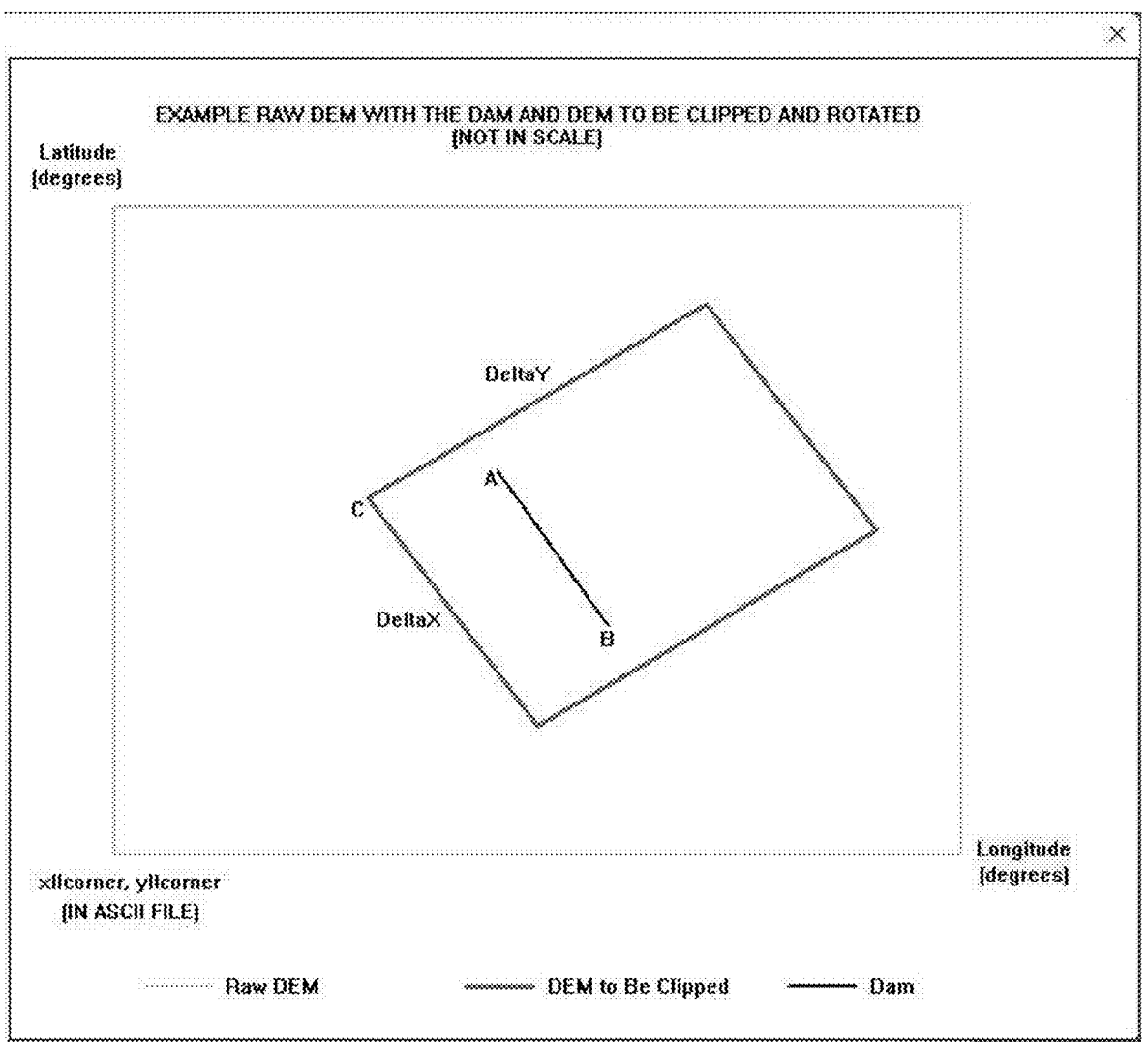
FIG. 9C – Example drawing in the input dialog to rotate the clipped and converted DEM
as shown in FIG. 9A

| Input type: | 1 | 1: Latitude and Longitude in Decimal Degrees |
| --- | --- | --- |
| | | 2: UTM Easting and Northing in Meters |

| Point A - Right Abutment of Dam (Seeing Downstream) | | |
| --- | --- | --- |
| Latitude or Easting | 43.911163 | |
| Longitude or Northing | -111.543504 | |

| Point B - Left Abutment of Dam (Seeing Downstream) | | |
| --- | --- | --- |
| Latitude or Easting | 43.90822 | |
| Longitude or Northing | -111.536262 | |

| Point C - Bottom-Left Point Around Which to Rotate the Clipped DEM | | |
| --- | --- | --- |
| Latitude or Easting | 43.908336 | |
| Longitude or Northing | -111.570254 | |

| DeltaX to Cut (meter) | 3200 | |
| --- | --- | --- |
| DeltaY to Cut (meter) | 3700 | |

| Units in Outer 2D SWE Grids: | 1 | 1: In Feet |
| --- | --- | --- |
| | | 2: In Meters |

| feet or meters to minus to convert vertical datum to dam's: | 3.599 | |
| --- | --- | --- |
| Desired Cell Size in Outer 2D SWE Grids (ft/m): | 50 | |

FIG. 9D – The input MS Excel file to rotate the clipped and converted DEM as shown in

FIG. 9A

| OUTPUTS |
| --- |
| These number are used in BREACH-3D inputs, spreadsheet named "DEM 2DSWE Input Files", to show the reservoir on the screen. |

| Point A - Dam's Right Abutment in Clipped DEM | |
| --- | --- |
| Easting # (Row number) in DEM.txt (output file) | 167 |
| Northing # (Column number) in DEM.txt (output file) | 229 |

| Point B - Dam's Left Abutment in Clipped DEM | |
| --- | --- |
| Easting # (Row number) in DEM.txt (output file) | 231 |
| Northing # (Column number) in DEM.txt (output file) | 229 |

FIG. 9E – The input MS Excel file to rotate the clipped and converted DEM as shown in FIG. 9A, with outputs written back to the same Excel file

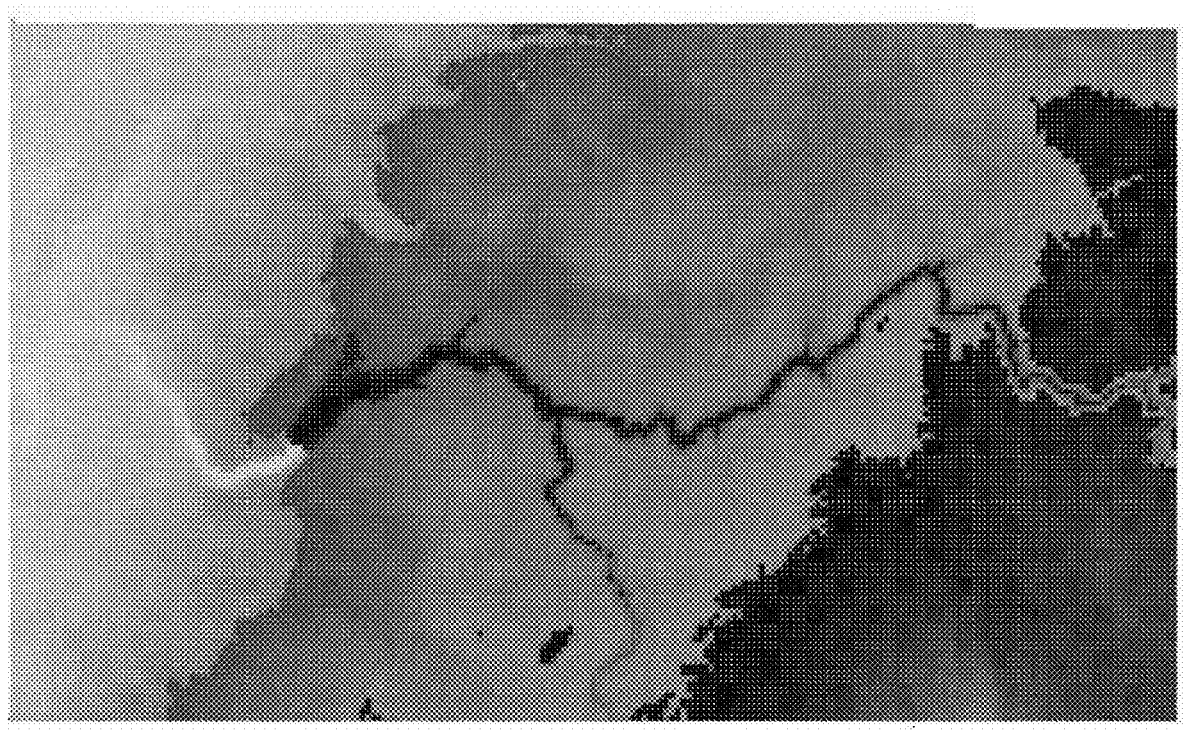
FIG. 10A – Teton Dam's reservoir found by this model and shown in dark color
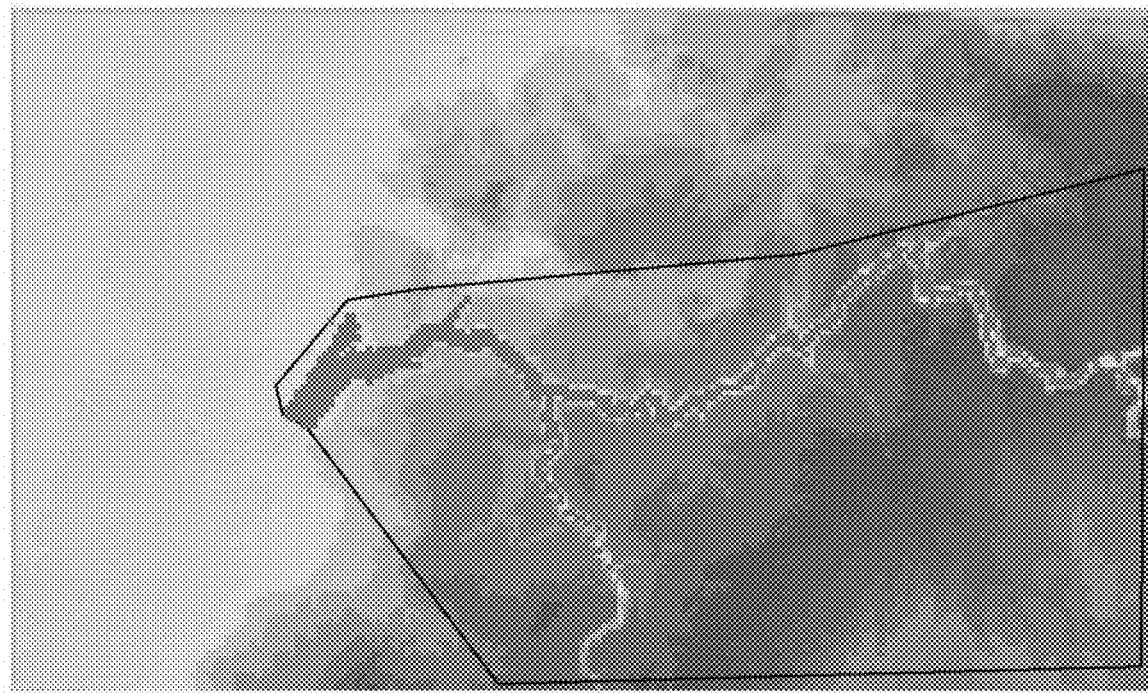
FIG. 10B – Teton Dam's reservoir found by this model and enclosed by lines Description: Please input the number and pairs of data corresponding to the number.
Words can be changed within a line, but please do not delete any line with descriptions, and do not add any line including blank line.
All northings at the dam's right side MUST be in descending order.
The northings of the dam's right and left abutment can be either in descending or ascending order.
Except the first point's northing on the dam's left which can be either larger or smaller than the dam's left abutment's northing, all other northings at the dam's left side MUST be in ascending order.
Eastings and Northings must be in meters. Stages can be in either meters or feet; HOWEVER, USER MUST WRTIE THEY ARE IN METERS OR IN FEET (1 FOR FOOT AND 2 FOR METER).
Number of points to define the reservoir at the dam's right side, seeing downstream:
5
Number of points to define the dam, with the right abutment first, and the left abutment last, seeing downstream:
2
Number of points to define the reservoir at the dam's left side, seeing downstream, and their easting and northing:
3
The easting and northing of points to define the reservoir at the dam's right side, seeing downstream, in meter:
477389        4868132
468945        4866055
459750        4865225
457941        4864937
456183        4862859
The easting and northing of points to define the dam, with the right abutment first, and the left abutment last, seeing downstream, in meter:
456360        4862150
456939        4861819
The easting and northing of points to define the reservoir at the dam's left side, seeing downstream, in meter:
461643        4855554
477347        4855976
477389        4868132
UNITS of delta Z and stages (1 FOR FOOT AND 2 FOR METER):
1
Feet or meters to minus to convert input DEM's vertical datum to dam's vertical datum. USGS 1/3 arc-second DEM (usually) uses NAVD88. While the dam's MSL (mean sea level) might use NGVD29.
3.599
In the Stage-Area chart, number of stages desiring reservoir surface area, and following by the stages, in feet or meters:
35
5027   5030   5040   5050   5060   5070   5080   5090   5100   5110
5120   5130   5140   5150   5160   5170   5180   5190   5200   5210
5220   5230   5240   5250   5260   5270   5280   5290   5295   5300
5301.7 5310   5320   5332   5335

Figure 10C:
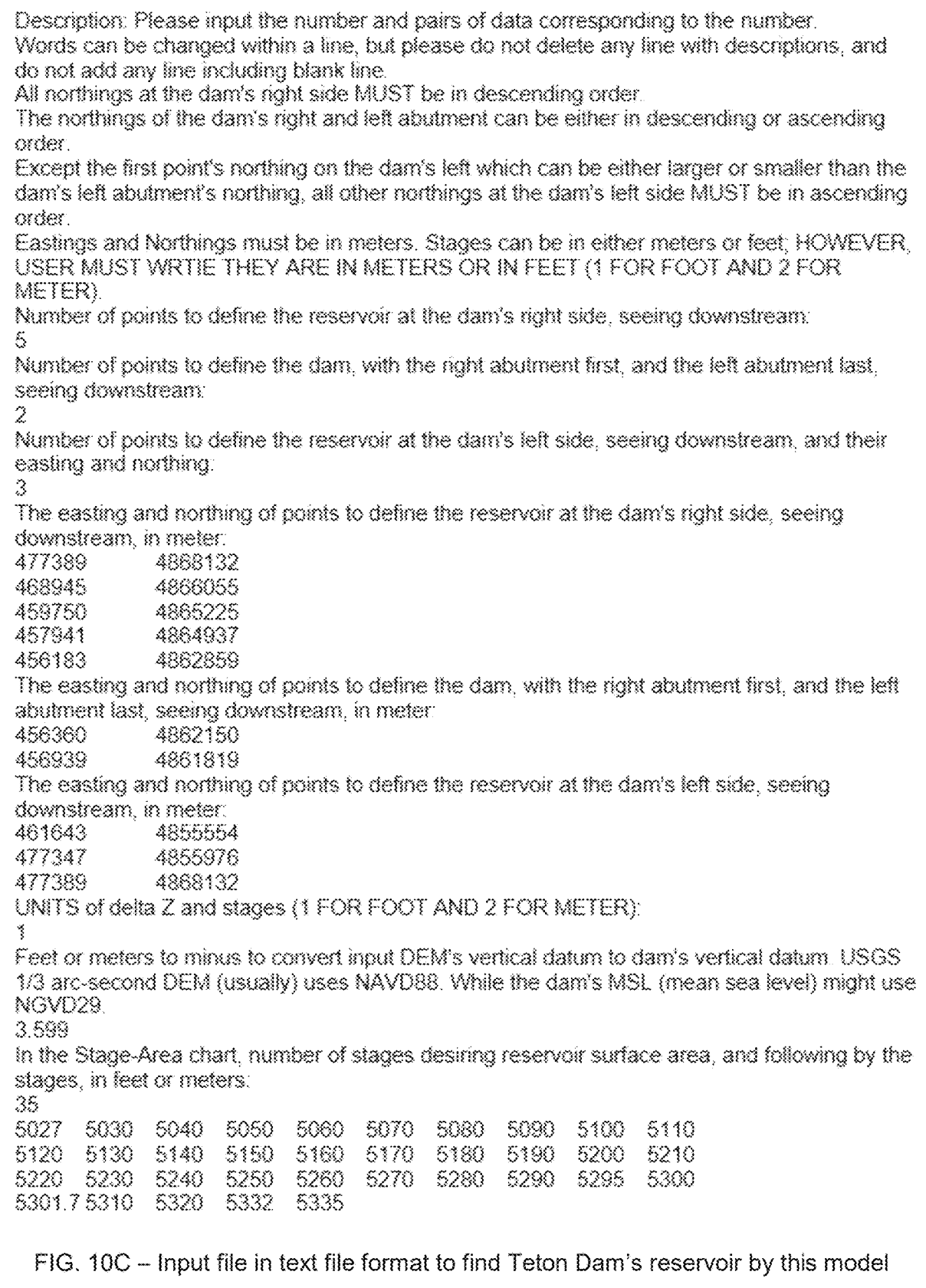

FIG. 10C -- Input file in text file format to find Teton Dam's reservoir by this model Results (SI Units first, and then English Units):

| Stage(meter) | Reservoir_Surface_Area(square_meter) | Stage(foot) | Reservoir_Surface_Area(acre) |
|---|---|---|---|
| 1532.23 | 0 | 5027 | 0 |
| 1533.14 | 5499.87 | 5030 | 1.35905 |
| 1536.19 | 327983 | 5040 | 81.0463 |
| 1539.24 | 594833 | 5050 | 146.986 |
| 1542.29 | 982257 | 5060 | 242.721 |
| 1545.34 | 1.23811e+06 | 5070 | 305.943 |
| 1548.38 | 1.46635e+06 | 5080 | 362.343 |
| 1551.43 | 1.75023e+06 | 5090 | 432.491 |
| 1554.48 | 2.023e+06 | 5100 | 499.895 |
| 1557.53 | 2.24829e+06 | 5110 | 555.563 |
| 1560.58 | 2.46384e+06 | 5120 | 608.828 |
| 1563.62 | 2.69959e+06 | 5130 | 667.084 |
| 1566.67 | 2.95851e+06 | 5140 | 731.064 |
| 1569.72 | 3.19289e+06 | 5150 | 788.98 |
| 1572.77 | 3.38253e+06 | 5160 | 835.841 |
| 1575.82 | 3.69666e+06 | 5170 | 913.464 |
| 1578.86 | 4.0147e+06 | 5180 | 992.053 |
| 1581.91 | 4.26907e+06 | 5190 | 1054.91 |
| 1584.96 | 4.57283e+06 | 5200 | 1129.97 |
| 1588.01 | 4.8657e+06 | 5210 | 1202.34 |
| 1591.06 | 5.13117e+06 | 5220 | 1267.94 |
| 1594.1 | 5.38152e+06 | 5230 | 1329.8 |
| 1597.15 | 5.63409e+06 | 5240 | 1392.21 |
| 1600.2 | 5.94811e+06 | 5250 | 1469.81 |
| 1603.25 | 6.23294e+06 | 5260 | 1540.19 |
| 1606.3 | 6.51947e+06 | 5270 | 1611 |
| 1609.34 | 6.81794e+06 | 5280 | 1684.75 |
| 1612.39 | 7.13958e+06 | 5290 | 1764.23 |
| 1613.92 | 7.30838e+06 | 5295 | 1805.94 |
| 1615.44 | 7.53271e+06 | 5300 | 1861.37 |
| 1615.96 | 7.61246e+06 | 5301.7 | 1881.08 |
| 1618.49 | 7.98191e+06 | 5310 | 1972.37 |
| 1621.54 | 8.48536e+06 | 5320 | 2096.78 |
| 1625.19 | 9.30716e+06 | 5332 | 2299.85 |
| 1626.11 | 9.50484e+06 | 5335 | 2348.7 |

FIG. 10D – Output file with the "stage – surface area" chart of Teton Dam's reservoir, found by this model

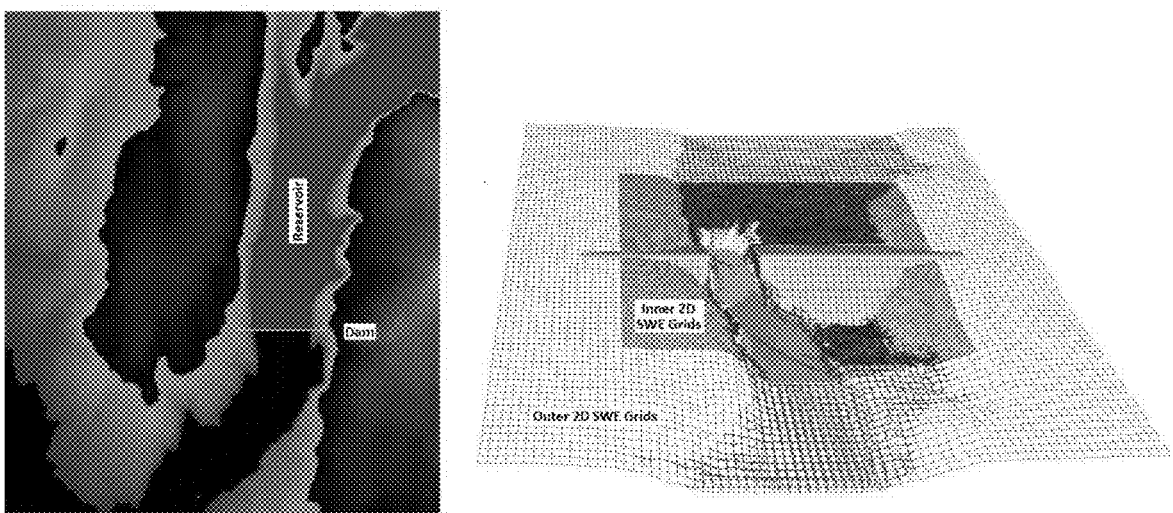
FIG. 11 - Calculated Teton Dam failure in Idaho in 1976 when the peak outflow was
released at the dam, modeled as a zoned soil dam, with DEM displayed
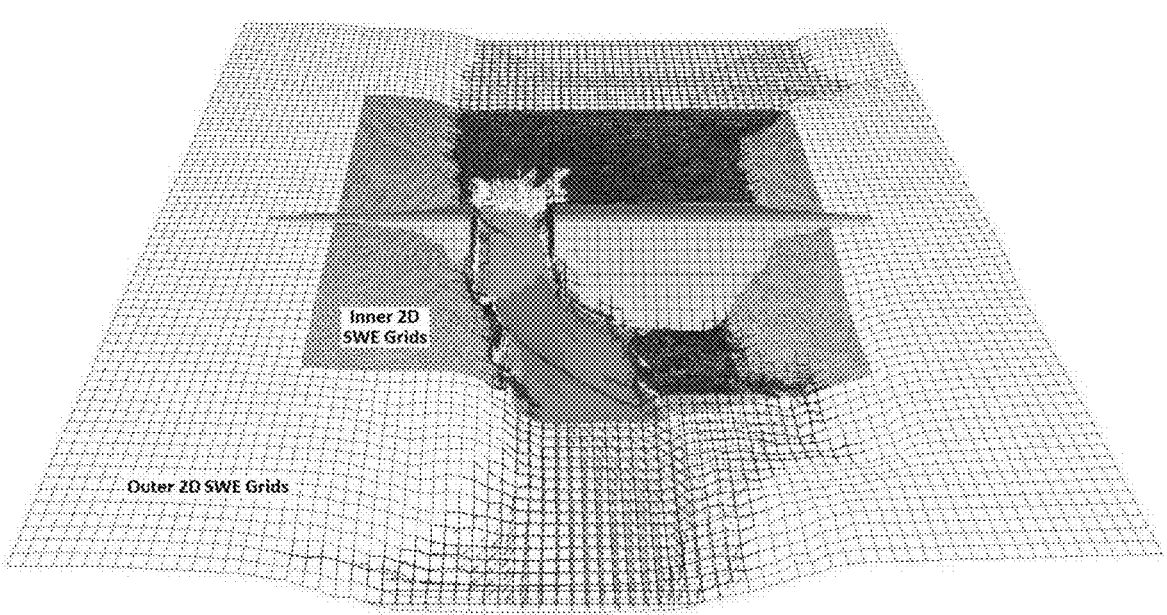
FIG. 12A - Calculated Teton Dam failure when the peak outflow was released at the
dam, with flow velocities displayed

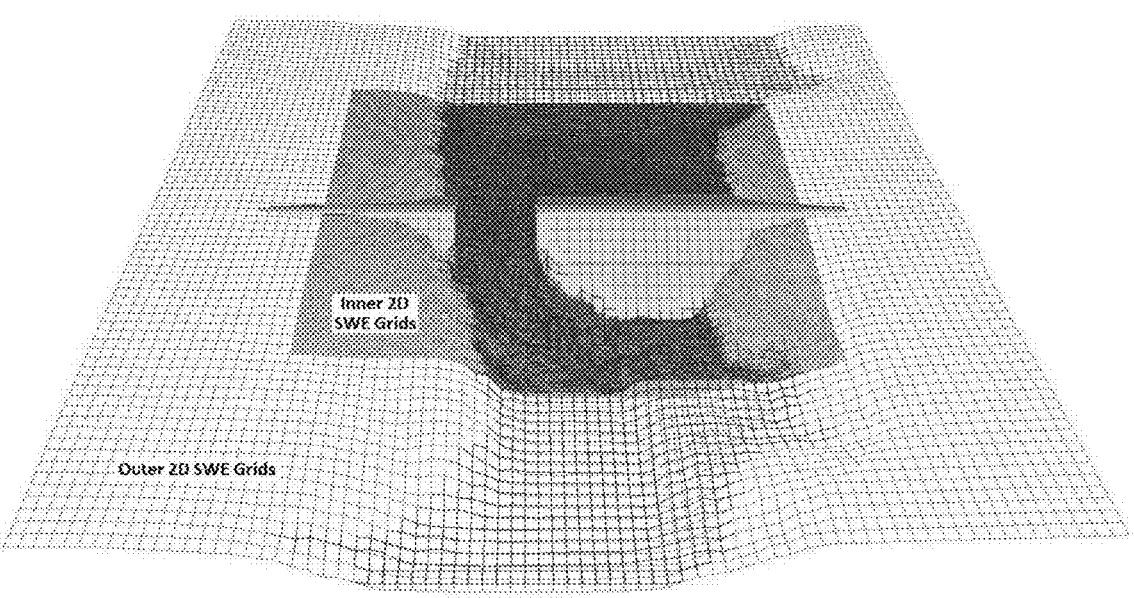
FIG. 12B - Calculated Teton Dam failure when the peak outflow was released at the dam, without flow velocities displayed
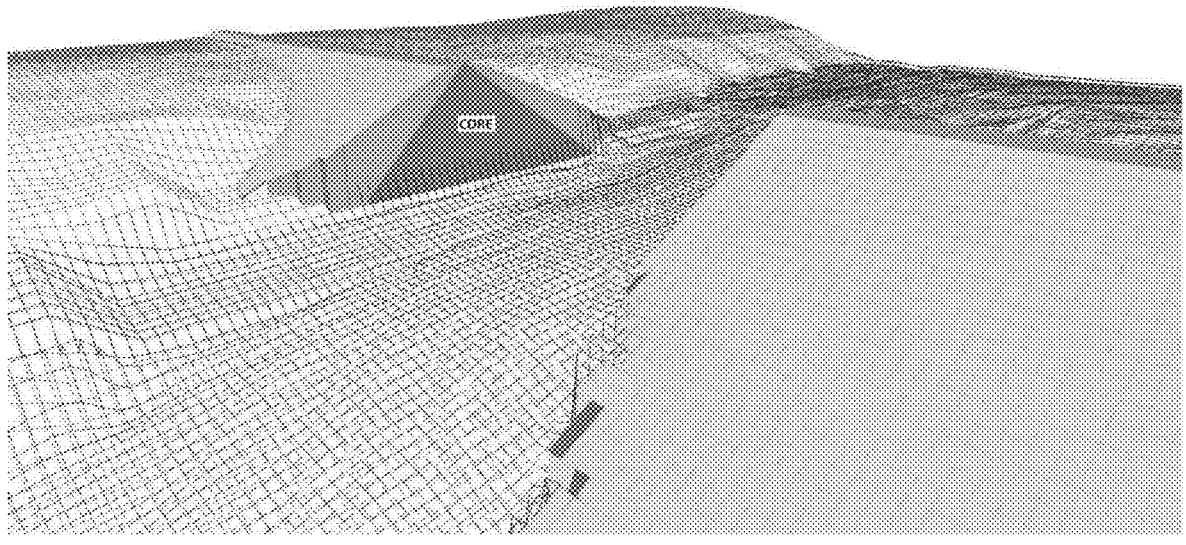
FIG. 13 - Calculated Teton Dam failure when the peak outflow was released at the dam, with clay core displayed

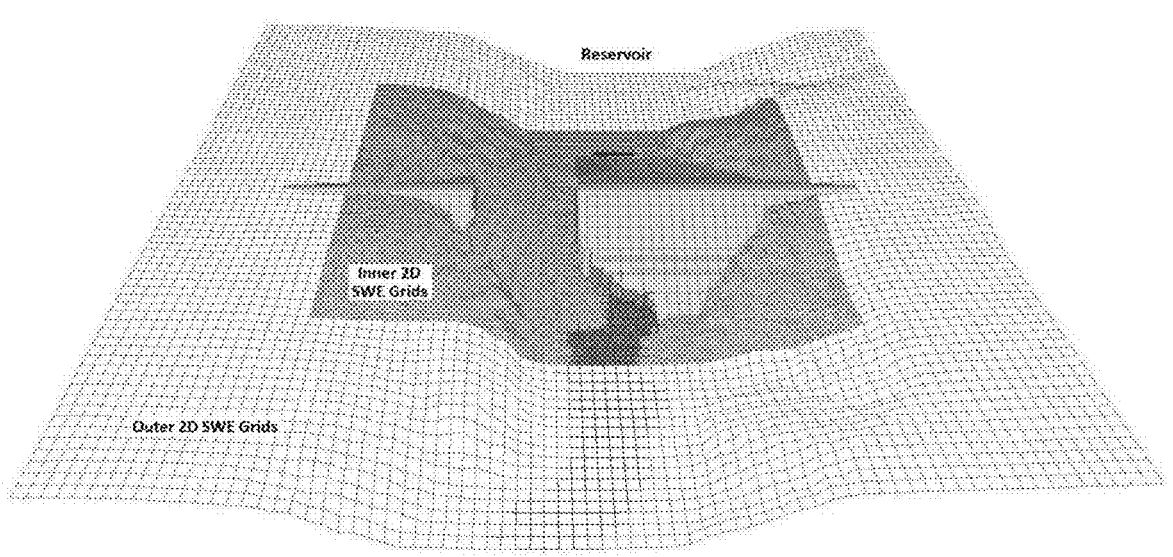
FIG. 14 - Calculated Teton Dam final failure shape
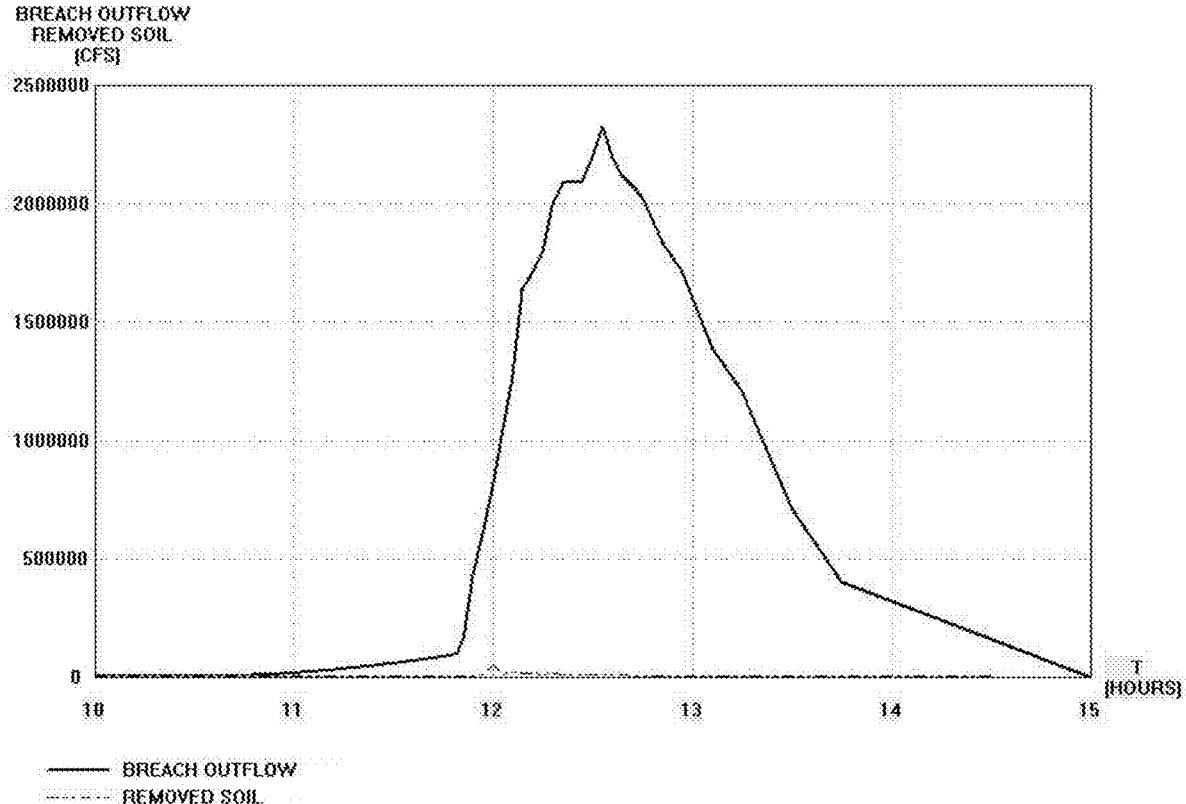
FIG. 15 - Calculated breach hydrograph and removed soil graph at Teton Dam

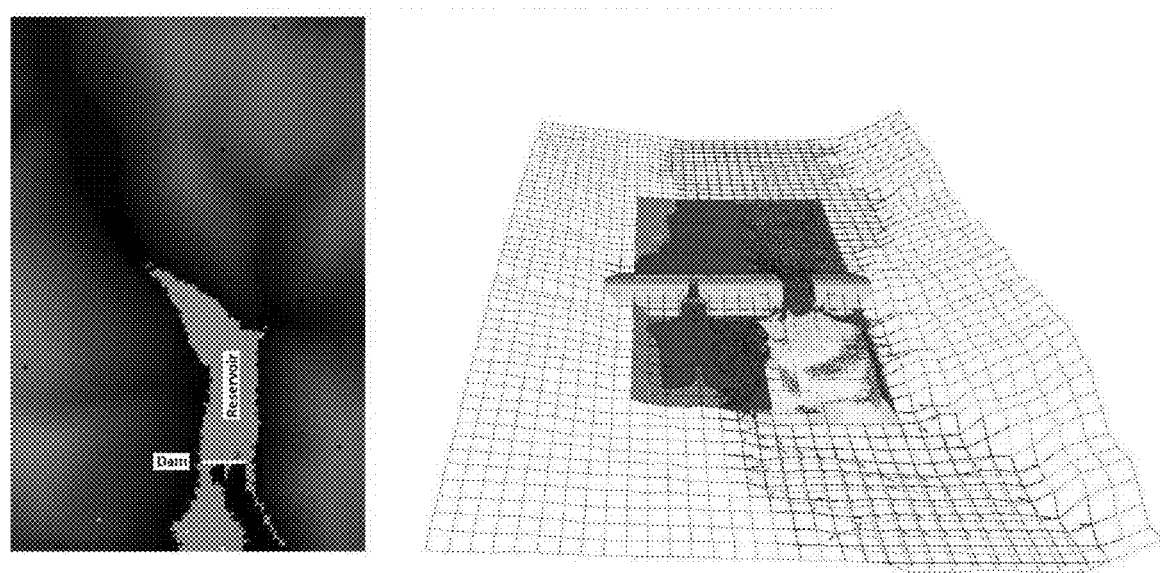
FIG. 16A - Calculated Laurel Run Dam failure in Pennsylvania in 1977 by the "leading
headcut" (left, viewing downstream), modeled as a zoned soil dam
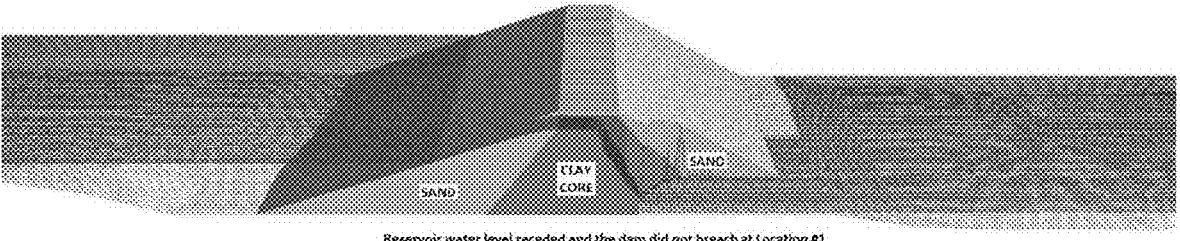
FIG. 16B - Calculated breach channel at Locaiton #1 for Laurel Run Dam failure, where
the dam didn't breach because reservoir water level receded

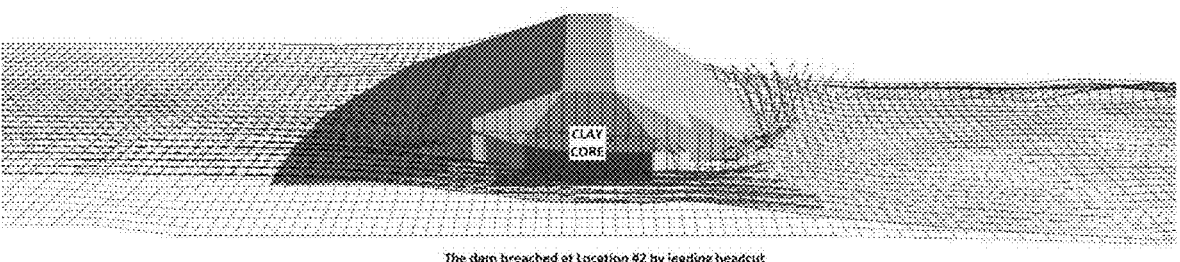
The dam breached at Location #2 by leading headcut
FIG. 16C - Calculated breach channel at Location #2 (left) for Laurel Run Dam failure, where the dam was breached by the "leading headcut"
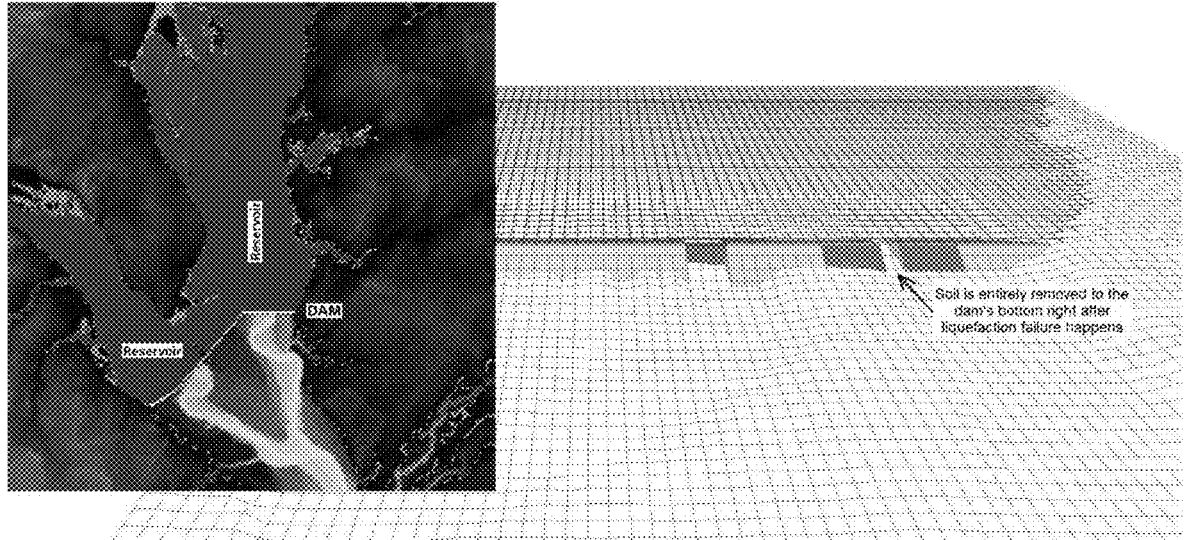
FIG. 17A - Liquefaction failure at Edenville Dam, Michigan, at 17:36 PM on May 19, 2020, modeled as a homogeneous non-cohesive soil dam

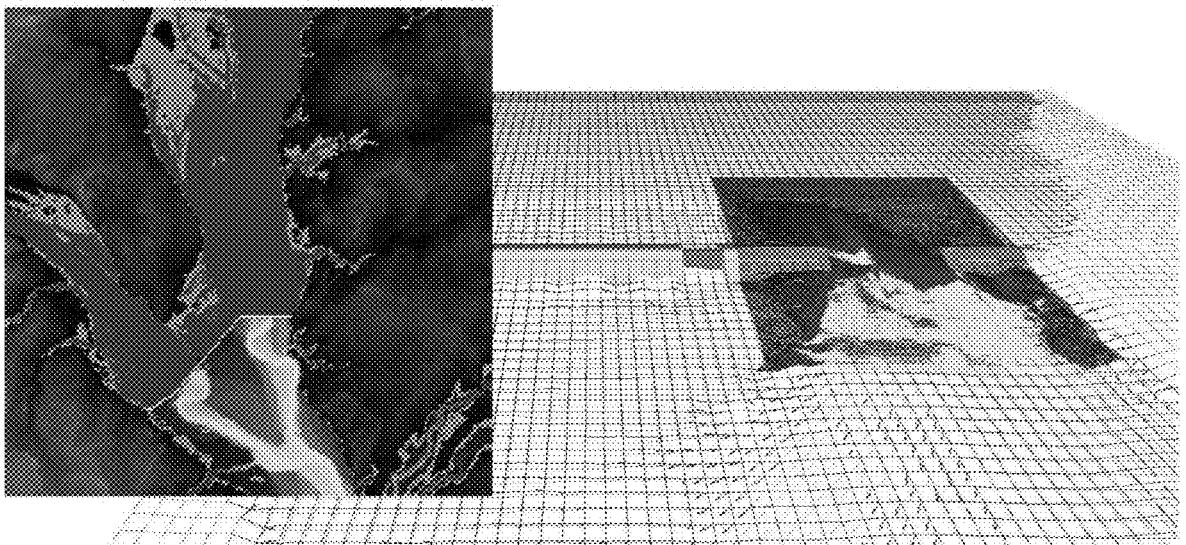
FIG. 17B - One hour later after the liquefaction failure at Edenville Dam, View 1
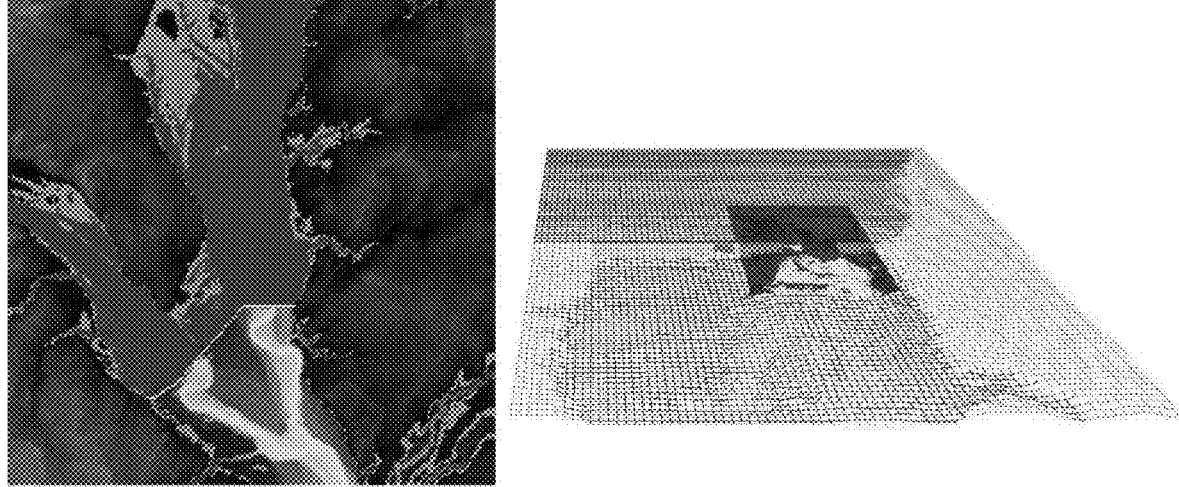
FIG. 17C - One hour later after the liquefaction failure at Edenville Dam, View 2

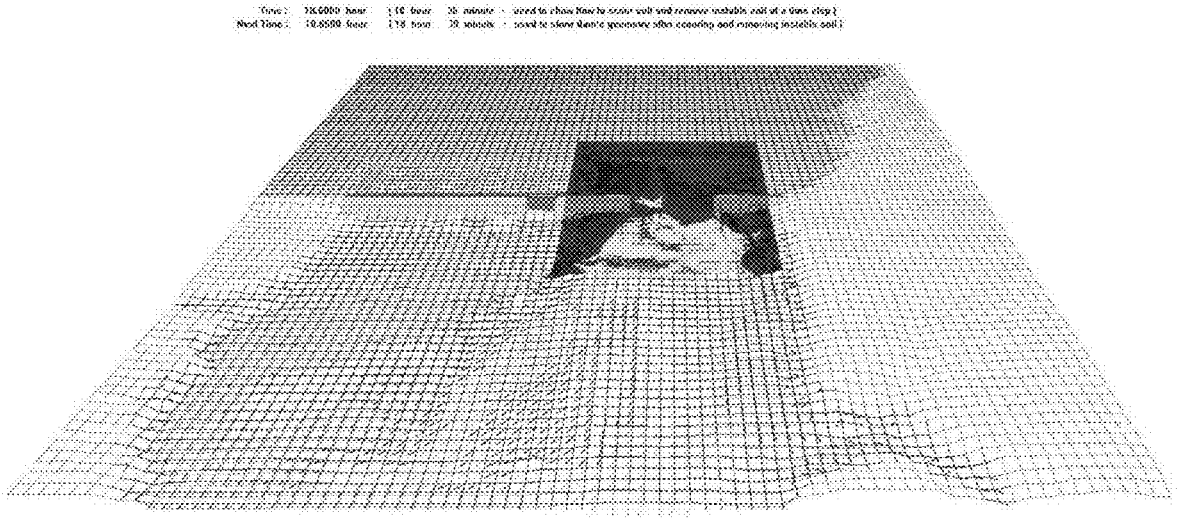
FIG. 17D - One hour later after the liquefaction failure at Edenville Dam, View 3
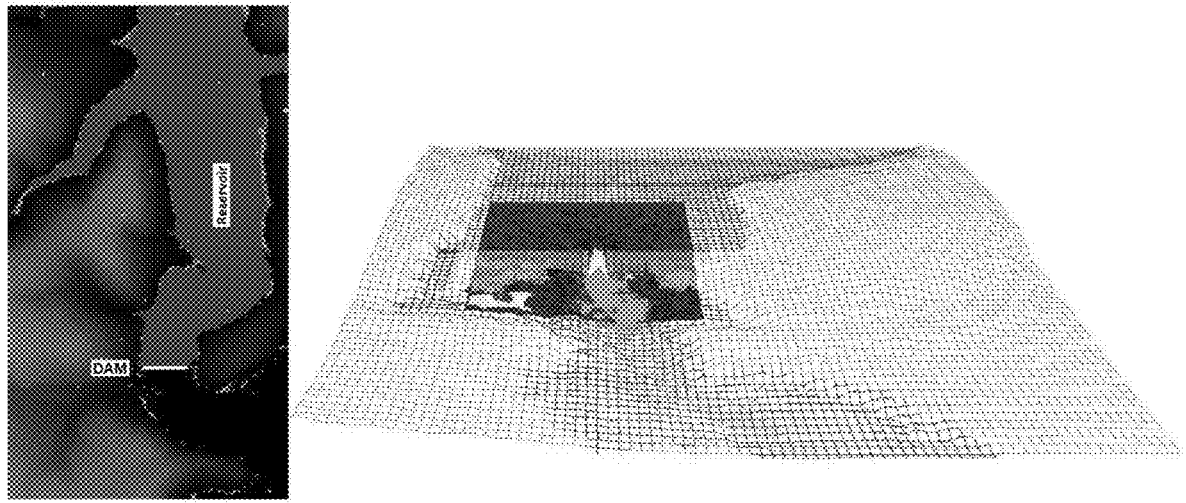
FIG. 18A – The simulated failure of South Fork Dam in Pennsylvania in 1889, modeled
as a homogeneous cohesive soil dam

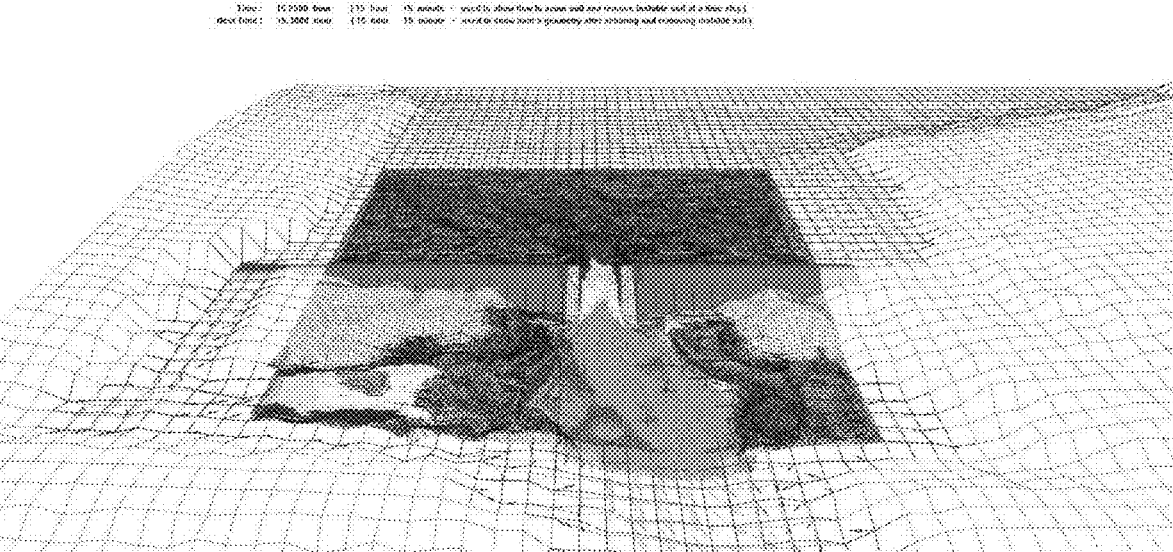
FIG. 18B – 3D slope stability at two sides of breach channel perpendicular to the main
flow direction is checked, and instable slopes are removed
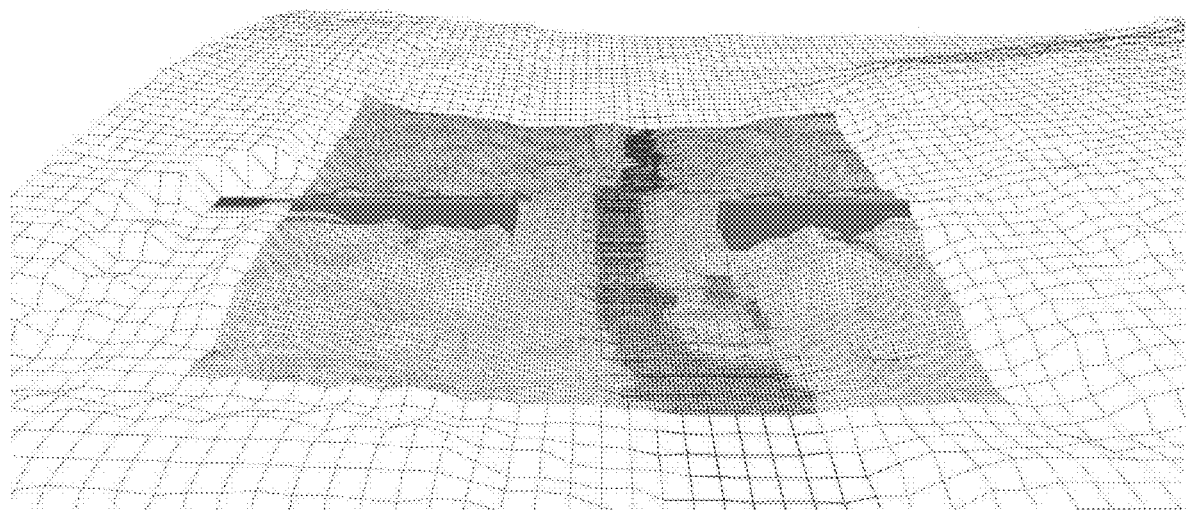
FIG. 18C – The calculated final breach shape of South Fork Dam

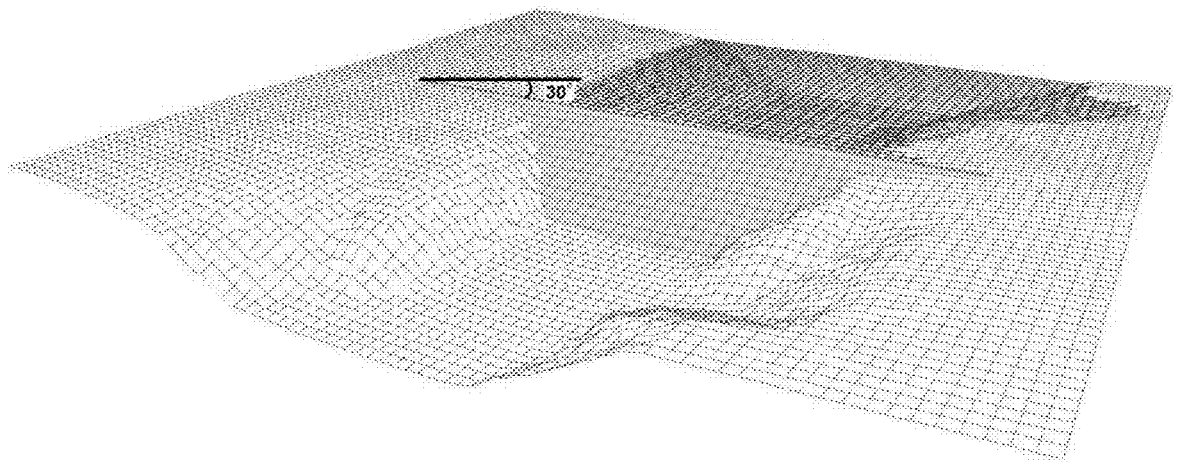
FIG. 19 – Teton Dam, displayed with an angle of 30 degrees to the horizontal line on a
computer's screen, which is given by the user in the input file

1

METHOD AND NUMERICAL THREE-DIMENSIONAL MODEL TO SIMULATE DAM BREACH FOR HOMOGENEOUS AND ZONED SOIL DAMS

US CLASS CURRENT

405/107

CPC CURRENT

| TYPE | CPC | DATE |
|------|-----|------|
| CPCI | E 02 B 7/06 | 2022 May |
| CPCI | Y 02 A 10/11 | 2022 May |

ACKNOWLEDGMENT

The inventor appreciates Alessandro Falappa for making the CGLEnabledView (version 1.4) Microsoft Visual C++ code available to be downloaded at www.codeproject.com and granting users the right to use, copy, and modify it. With necessary revisions, the CGLEnabledView (version 1.4) Microsoft Visual C++ code is used to show the dam breaching process using OpenGL.

BACKGROUND OF THE INVENTION

Field

This invention relates to a numerical method for calculating the dam breach hydrograph for a homogeneous or zoned soil dam in overtopping, piping, and/or liquefaction failures, and a corresponding computer program/model executing on a computer running on Microsoft Windows.

Background

The following abbreviations are herein defined and referred within the following description: American Association of State Highway and Transportation Officials (AASHTO), Agricultural Research Service (ARS), cubic foot per second (cfs), Digital Elevation Models (DEM), Figure (FIG.), foot (ft), Investigation of Extreme Flood Processes and Uncertainty (IMPACT), Kilopascal (kPa), National Weather Service (NWS), North American Vertical Datum of 1988 (NAVD88), one-dimensional (1D), pounds per square foot (psf), Shallow Water Equations (SWE), three-dimensional (3D), two-dimensional (2D), Universal Transverse Mercator (UTM), U.S. Army Corps of Engineers (USACE), and U.S. Geological Survey (USGS).

The "left" side and "right" side of a dam and its breach channel are defined with the observer viewing the dam by looking in the downstream direction.

The dam breach hydrograph has been studied for decades since 1970s. Dr. Danny L. Fread at U.S. National Weather Service (NWS) developed NWS DAMBRK (Fread 1984) and NWS FLDWAV (Fread and Lewis, 1998) models to calculate the dam break hydrograph using pre-determined breach parameters that have been widely used in dam safety engineering, and developed NWS BREACH (Fread 1988) to calculate the breach parameters and breach hydrograph using a physically based method. U.S. Agricultural Research Service (ARS) did lots of headcut study to cohesive embankments and developed WinDAM C software to model erosion in earthen embankments. To better understand breach formation process, five physical dam-break tests were performed in Norway in 2002 and 2003 through European Commission funded IMPACT (Investigation of Extreme Flood Processes and Uncertainty) project.

Funded by Utah State University, and under the supervision of his major professor Dr. David S. Bowles, Zhengang Wang (the inventor himself) developed a numerical three-dimensional overtopping dam breach model for homogeneous non-cohesive soil dam in his Ph.D. dissertation in 2005, which covered a much wider area than existing models at that time, but was only tested using IMPACT Test #2 that was a homogenous non-cohesive soil dam overtopping failure with test data published through IMPACT Workshops and Meetings by 2005. After the research work was published by *Advances in Water Resources* through three journal articles in 2006 (Wang and Bowels, 2006a-c), the test data of all IMPACT's five physical tests were revised in 2008 (Hassan and Morris, 2008). That research only studied the overtopping breach of non-cohesive soil dam, and it did not touch headcut migration which is a difficult topic in dam breach modeling. That model used NWS BREACH's method to breach the dam until the dam crest is vertically eroded by 2 feet (0.61 meter), thereby it bypassed the headcut migration problem.

Dr. Weiming Wu developed DL Breach model (Wu 2013), which used ARS's pre-determined method (Temple 1992) to simulate headcut migration in cohesive embankments' overtopping failure, and used a pre-determined temporal evolution of 1D overtopping breach process for overtopping failure of zoned soil dams. DL BREACH has been included in USACE's HEC-RAS model. Both WinDAM C and DL Breach use the pre-determined soil parameters (such as material-dependent coefficients of headcut migration and/or lateral widening, soil erodibility coefficient, etc.) in overtopping failure of a cohesive embankment/dam.

BRIEF SUMMARY OF THE INVENTION

This method uses 3D cuboids extending vertically from a dam's bottom to its surface to remember soil properties, hydraulic characteristics, topo information before and after erosion and stability analyses, etc.; uses different erosion formulae to calculate erosion rates of different AASHTO Soil Groups under different construction compaction efforts; performs 3D slope stability analysis during the headcut migration stage along the main flow direction in the breach channel, before a dam is breached through to its bottom; performs 3D slope stability analysis during the lateral widening stage perpendicular to the main flow direction in the breach channel, after a dam has been breached through to its bottom; and checks local force equilibrium in the entire dam-breaching process. The topographic information surrounding the dam is pulled out from USGS DEM as a domain of the outer 2D Shallow Water Equations (SWE) that controls the hydraulic boundary conditions. Normal flow, orifice flow, 1D SWE, and inner 2D SWE are solved to simulate the dam break flow at different breaching stages.

BRIEF DESCRIPTION OF DRAWINGS

In the following, this disclosure is described with reference to the appended Figures. However, the scope of the invention is not limited to the specific features illustrated and disclosed by the Figures, wherein FIG. 1A shows a basic cuboid having one soil, named as Cuboid Type 1, which is used to model the homogeneous soil dam and the shell area of a zoned soil dam except the upstream and downstream toes.

FIG. 1B shows a basic cuboid having two soils, named as Cuboid Type 2, with one soil on top and another soil on bottom, which is used to model the core area of a zoned soil dam.

FIG. 1C shows a basic cuboid having one soil located at the upstream toe of a dam, named as Cuboid Type 3.

FIG. 1D shows a basic cuboid having one soil located at the downstream toe of a dam, named as Cuboid Type 4.

FIG. 2A shows Cuboid Type 1 with lateral erosion, named as Erosion Type 1, located at the left side of a breach channel.

FIG. 2B shows Cuboid Type 1 with lateral erosion, named as Erosion Type 1, located at the right side of a breach channel.

FIG. 2C shows Cuboid Type 2 with lateral erosion, named as Erosion Type 1, located at the left side of a breach channel.

FIG. 2D shows Cuboid Type 2 with lateral erosion, named as Erosion Type 1, located at the right side of a breach channel.

FIG. 2E shows Cuboid Type 3 with lateral erosion, named as Erosion Type 1, located at the left side of a breach channel.

FIG. 2F shows Cuboid Type 3 with lateral erosion, named as Erosion Type 1, located at the right side of a breach channel.

FIG. 2G shows Cuboid Type 4 with lateral erosion, named as Erosion Type 1, located at the left side of a breach channel.

FIG. 2H shows Cuboid Type 4 with lateral erosion, named as Erosion Type 1, located at the right side of a breach channel.

FIG. 3A shows Cuboid Type 1 with lateral erosion, named as Erosion Type 2, located at the left side of a breach channel.

FIG. 3B shows Cuboid Type 1 with lateral erosion, named as Erosion Type 2, located at the right side of a breach channel.

FIG. 3C shows Cuboid Type 2 with lateral erosion, named as Erosion Type 2, located at the left side of a breach channel.

FIG. 3D shows Cuboid Type 2 with lateral erosion, named as Erosion Type 2, located at the right side of a breach channel.

FIG. 4A shows Cuboid Type 2 with lateral erosion, named as Erosion Type 3, located at the left side of a breach channel.

FIG. 4B shows Cuboid Type 2 with lateral erosion, named as Erosion Type 3, located at the right side of a breach channel.

FIG. 4C shows Cuboid Type 2 with lateral erosion, named as Erosion Type 4, located at the left side of a breach channel.

FIG. 4D shows Cuboid Type 2 with lateral erosion, named as Erosion Type 4, located at the right side of a breach channel.

FIG. 4E shows Cuboid Type 2 with lateral erosion, named as Erosion Type 5, located at the left side of a breach channel.

FIG. 4F shows Cuboid Type 2 with lateral erosion, named as Erosion Type 5, located at the right side of a breach channel.

FIG. 5A shows Cuboid Type 1 with a circular piping path, located at the left side of a breach channel.

FIG. 5B shows Cuboid Type 1 with a circular piping path, located at the right side of a breach channel.

FIG. 5C shows Cuboid Type 1 with a rectangular piping path, located at the left side of a breach channel.

FIG. 5D shows Cuboid Type 1 with a rectangular piping path, located at the right side of a breach channel.

FIG. 6A shows Cuboid Type 2, Case 1, with a circular piping path, located at the left side of a breach channel.

FIG. 6B shows Cuboid Type 2, Case 1, with a circular piping path, located at the right side of a breach channel.

FIG. 6C shows Cuboid Type 2, Case 2, with a circular piping path, located at the left side of a breach channel.

FIG. 6D shows Cuboid Type 2, Case 2, with a circular piping path, located at the right side of a breach channel.

FIG. 7A shows Cuboid Type 2, Case 1, with a rectangular piping path, located at the left side of a breach channel.

FIG. 7B shows Cuboid Type 2, Case 1, with a rectangular piping path, located at the right side of a breach channel.

FIG. 7C shows Cuboid Type 2, Case 2, with a rectangular piping path, located at the left side of a breach channel.

FIG. 7D shows Cuboid Type 2, Case 2, with a rectangular piping path, located at the right side of a breach channel.

FIG. 8A shows default phreatic surface defined by lines A-B-C-D-E-F in zoned dams with a clay core.

FIG. 8B shows default phreatic surface defined by lines A-B-C-D-E-F in homogeneous dams, in which elevations of Points B, C, D, E, and F are calculated using the method of Phatak et al. (2004).

FIG. 9A shows a smaller DEM for Teton Dam, clipped from USGS DEM, converted to UTM in meters and shown by this model.

FIG. 9B shows the input dialog to rotate the clipped and converted DEM as shown in FIG. 9A.

FIG. 9C shows an example drawing in the input dialog to rotate the clipped and converted DEM as shown in FIG. 9A

FIG. 9D shows the input Excel file to rotate the clipped and converted DEM as shown in FIG. 9A, which is an alternative method to the input dialog as shown in FIG. 9B.

FIG. 9E shows the input MS Excel file to rotate the clipped and converted DEM as shown in FIG. 9A, with outputs written back to the same Excel file FIG. 10A shows Teton Dam's reservoir found by this model and shown in dark color.

FIG. 10B shows Teton Dam's reservoir found by this model and enclosed by lines.

FIG. 10C shows the input file in text file format to find Teton Dam's reservoir by this model.

FIG. 10D shows the output file with the "stage-surface area" chart of Teton Dam's reservoir found by this model.

FIG. 11 shows the calculated Teton Dam failure in Idaho in 1976 when the peak outflow was released at the dam, modeled as a zoned soil dam, with DEM displayed.

FIG. 12A shows the calculated Teton Dam failure when the peak outflow was released at the dam, with flow velocities displayed.

FIG. 12B shows the calculated Teton Dam failure when the peak outflow was released at the dam, without flow velocities displayed.

FIG. 13 shows the calculated Teton Dam failure when the peak outflow was released at the dam, with clay core displayed.

FIG. 14 shows the calculated Teton Dam final failure shape.

FIG. 15 shows the calculated breach hydrograph and removed soil graph at Teton Dam.

FIG. 16A shows the calculated Laurel Run Dam failure in Pennsylvania in 1977 by the "leading headcut" at Location #2 (left, viewing downstream), modeled as a zoned soil dam, by using the maximum measured unconfined compressive strength of 953 psf (45.6 kPa) for clay core according to Gray (1992) at Location #1, and using the minimum measured unconfined compressive strength of 410 psf (19.6 kPa) for clay core according to Gray (1992) at Location #2.

FIG. 16B shows the calculated breach channel at Location #1 (right) for Laurel Run Dam failure, where the dam didn't breach because reservoir water level receded.

FIG. 16C shows the calculated breach channel at Location #2 (left) for Laurel Run Dam failure, where the dam was breached by the "leading headcut".

FIG. 17A shows the liquefaction failure at Edenville Dam, Michigan, at 17:36 PM on May 19, 2020, modeled as a homogeneous non-cohesive soil dam.

FIG. 17B shows the breach shape at one hour after the liquefaction failure at Edenville Dam, View 1.

FIG. 17C shows the breach shape at one hour after the liquefaction failure at Edenville Dam, View 2.

FIG. 17D shows the breach shape at one hour after the liquefaction failure at Edenville Dam, View 3.

FIG. 18A shows the simulated failure of South Fork Dam in Pennsylvania in 1889, when the dam was breached through and the emergency spillway was still releasing flow, modeled as a homogeneous cohesive soil dam.

FIG. 18B shows that the instable slopes at two sides of the breach channel are removed in Stage 3 using South Fork Dam as an example. The 3D slope stability at two sides of the breach channel perpendicular to the main flow direction is checked in Stage 3 (lateral widening stage after the dam is breached to its bottom), and instable slopes are removed.

FIG. 18C shows the calculated final breach shape of South Fork Dam.

FIG. 19 shows Teton Dam, displayed with an angle of 30 degrees to the horizontal line on a computer's screen, which is given by the user in the input file.

DETAILED DESCRIPTION OF THE INVENTION

Input files of this model are prepared using a free software QGIS, this model itself, and Microsoft Excel. USGS DEM containing the dam and reservoir is downloaded firstly. Then the USGS DEM is clipped to an Esri ASCII file containing the dam and its reservoir using QGIS. This model along with its pre-processing functions can project the ASCII elevations in decimal degree coordinates (latitude/longitude) to Universal Transverse Mercator (UTM) corresponding zone in meters, and rotate it so that the dam's centerline is displayed horizontally on a computer screen and the reservoir is displayed on the top of the dam always. In this model, the dam can be displayed horizontally at a computer screen and its reservoir is shown at the dam's top, or the dam can be displayed with an angle between 0 and 360 degrees given by the user, by using 0 (or 360) degree when the dam is displayed horizontally at a computer screen and its reservoir is shown at the dam's top. This model's pre-processing functions can also calculate the reservoir's stage-area chart from the projected DEM, and adjust the elevation difference between the dam's vertical datum and USGS DEM's vertical datum (which is usually North American Vertical Datum of 1988, NAVD88).

This invention uses a large layer of outer 2D SWE grids, which can be pulled out from USGS DEM and corrected using real dam's data, and covers the entire dam and portion of the dam's upstream and downstream areas, to control the upstream inflow condition and downstream outflow condition. And it uses a smaller layer of inner 2D SWE grids automatically by this model to cover the dam's breached portion and the breach channel area. The outer 2D SWE grids and the inner 2D SWE grids exchange data at each time-step calculation, so that the inner 2D SWE grids' boundary conditions are controlled by the outer 2D SWE grids and the outer 2D SWE grids' data inside of the inner 2D SWE grids are controlled by the inner 2D SWE grids. The upstream and downstream conditions of normal flow, orifice flow, and 1D SWE are also controlled by the outer 2D SWE grids when they are used.

The following breaching process is used in this method/model for a dam failure:

Stage 2—Right after the dam is overtopped either by static reservoir water level or by wind-generated wave, until the dam is fully breached to its bottom, the dam breaching process is in Stage 2. In Stage 2, flow depths and velocities calculated by normal flow, 1D SWE, or 2D SWE are used to do the clear water scouring and force/moment equilibrium analyses. In this stage, 3D slope stability analysis is performed to the breach channel along the main flow direction, local force equilibrium is checked, and instable soil blocks are removed.

Stage 3—After the dam is fully breached to its bottom, the breaching process is in Stage 3. Stage 3 is the lateral widening process. In Stage 3, flow depths and velocities calculated by 2D SWE are used to do the clear water scouring and force/moment equilibrium analyses. In this stage, 3D slope stability analysis is performed to two sides of the breach channel perpendicular to the main flow direction, local force equilibrium is checked, and instable soil blocks are removed.

Stage 4—Right after piping breach starts, until the pipe roof collapses, the dam breaching process is in Stage 4. Either Stage 2 follows Stage 4 if the dam hasn't breached to its bottom when the pipe roof collapses, or Stage 3 follows Stage 4 if the dam has breached to its bottom when the pipe roof collapses. After the pipe roof collapses, the piping breach process becomes the same as overtopping breach in either Stage 2 or Stage 3. Stage 2 follows Stage 4 if the dam hasn't breached to its bottom when the pipe roof collapses. Or Stage 3 follows Stage 4 if the dam has breached to its bottom when the pipe roof collapses. Stage 4 contains three sub-stages:

(1) Stage 4-1: It uses a piping hole inside of the dam, with inlet-control "just-full" orifice flow in the piping hole.

(2) Stage 4-2: It uses a rectangular piping path inside of the dam, with inlet-control "just-full" orifice flow in the piping path. This is just one time-step transition between Stage 4-1 and Stage 4-3.

(3) Stage 4-3: This is the 3D breaching process with the free-surface open channel flow that is used in overtopping breach, and with the pipe roof remaining in place and being eroded laterally. The same breaching method as used in Stage 2 or Stage 3 is used, depending on whether the dam hasn't or has been fully breached through to the dam's bottom, respectively. The pipe roof is eroded laterally and kept until it loses force equilibrium and collapses.

Six points are used to define the phreatic surface in a zoned soil dam. And six points are used to define the phreatic surface in a homogeneous soil dam. The erosion rates to different soils are calculated using different corresponding formulae, including but not limited to the formulae developed by Chen and Anderson (1987a, 1987b) and Clopper and Chen (1988), according to different AASHTO Soil Groups and different construction compaction efforts when the dam was built.

In this model/method, an overtopping failure can start from a pilot channel that is located at the dam's crest and is lower than the dam crest or at the same elevation of the dam crest, as used in IMPACT Field Tests #1 and #2 (Hassan and Morris, 2008); or a dam can be breached by "leading headcut" when it is overtopped everywhere on its crest. "Leading headcut" is defined as the headcut that breaches an earthen dam at a location when the dam is overtopped everywhere along its crest, because that location either has the lowest crest elevation or the largest overtopping depth because of the combination of wave overtopping, or has the worst soil properties, or both, or because of any other unknown reasons and uncertainties.

In this model/method, a piping failure is initiated by pushing a theoretic straight rod from the dam's downstream face into the dam and all the way to the dam's upstream face, and then pulling the rod out immediately.

A wave overtopping failure is modeled in the same way as a normal overtopping breach except the followings:

(1) The fetch, wind setup, and wave runup at every location along the dam are calculated at the beginning according to the dam crest elevation, wind direction and velocity.

(2) Wave overtopping rate is calculated when the reservoir water level is approaching to the dam's crest or the top of pilot channel. If wave overtopping rate is a positive value, the wave overtopping breach starts in the same way as a normal overtopping breach by using an equivalent overtopping depth that results in the same static overtopping rate as the wave overtopping rate.

(3) Once the wave overtopping rate is similar to the normal overtopping rate, wave overtopping is no longer considered, and the exact normal overtopping failure starts.

A liquefaction failure is modeled by removing all soil within the given pilot channel to the dam's bottom immediately when a liquefaction happens at a given high reservoir water level or a time, and then doing the lateral widening in Stage 3 directly.

Multiple breach locations are modeled as a loop starting from the first breach location to the last breach location at each time step. The total breach outflow is the combination of all breach outflows at all breach locations. Each breach location can have either overtopping (or wave overtopping), or piping, or liquefaction failure mode.

REFERENCES

Chen, Y. H., Anderson, B. A., 1987a. Development of a methodology for estimating embankment damage due to flood overtopping. U.S. Department of Transportation, Federal Highway Administration, Report No. FHWA/RD-86/126. https://ntrl.ntis.gov/NTRL/dashboard/search Results/titleDetail/PB87178356.xhtml.

Chen, Y. H., Anderson, B. A., 1987b. Methodology for estimating embankment damage caused by flood overtopping. Transportation Research Record, 1151.

Clopper, P. E., Chen, Y. H., 1988. Minimizing embankment damage during embankment flow. Final Report No. FHWA/RD-88/181, Simons, Li and Associates, Inc. for Federal Highway Administration and Bureau of Reclamation. Contract No. DTFH61-85-C-00131. https://www.usbrgovitsc/techreferences/hydraulics_lab/pubs/PAP/PAP-0607.pdf.

Fread, D. L., 1984. DAMBRK: The NWS dam-break flood forecasting model, Hydrologic Research Laboratory, National Weather Service, Silver Spring, Maryland, USA.

Fread D. L., 1988. BREACH: An erosion model for earthen dam failures. National Weather Service, Office of Hydrology, Silver Spring, Maryland, USA.

Fread, D. L, Lewis, J. M, 1998. NWS FLDWAV model, National Weather Service, NOAA, Silver Spring, Maryland, USA.

Gray, R. E., 1992. Chapter 13—Failure of Laurel Run Dam. In Geomechanics and Water Engineering in Environmental Management (book), Editor: Robin Chowdhury.

Hassan, M. A. A. M., Morris, M. W., 2008. IMPACT Project field tests data analysis. FLOODsite Report T04-08-04. UK. Website: https://www.floodsite.net/html/partner_area/project_docs/T04_08_04_IMPACT_Data_Analysis_v3_3.pdf Phatak, D. R., Pathak, S. R., Birid, K. C., 2004. Estimation of phreatic line using dimensional analysis. In Fifth International Conference on Case Histories in Geotechnical Engineering, New York, USA, Apr. 13-17, 2004.

Temple, D. M. (1992). Estimating flood damage to vegetated deep soil spillways. Applied Engineering in Agriculture, 8(2), 237-242.

Wang, Z., Bowles, D. S., 2006a. Three-dimensional non-cohesive earthen dam breach model. Part 1, theory and methodology. Advances in Water Resources. Vol. 29 (10): 1528-1545.

Wang, Z., Bowles, D. S., 2006b. Three-dimensional non-cohesive earthen dam breach model. Part 2, validation and applications. Advances in Water Resources. Vol. 29 (10): 1490-1503.

Wang, Z., Bowles, D. S., 2006c. Dam breach simulations with multiple breach locations under wind and wave Actions. Advances in Water Resources. Vol. 29 (8): 1222-1237.

Wu, W., 2013. Simplified physically-based model of earthen embankment breaching. Journal of Hydraulic Engineering, ASCE, 139(8), 837-851.

The invention claimed is:

1. A numerical method of calculating a dam breach hydrograph along with a removed soil graph, and a corresponding computer program/model executing on a computer, the method performing the steps of:

wherein the dam is one of a homogeneous cohesive soil dam, a homogenous non-cohesive soil dam, and a zoned soil dam with a cohesive soil core and shells being one of non-cohesive soil and another cohesive soil with a less cohesion and/or a smaller plasticity index than the cohesive soil of the core;

wherein a 3D cuboids with one of a soil types, extending vertically from a dam's bottom to a dam's surface, is used to model homogeneous cohesive or non-cohesive soil dams, to model the shell soil of a zoned soil dam, and to model any portion of the dam that contains only one soil from bottom of dam vertically to surface of the dam;

wherein the 3D cuboids with two types of soil, with one soil on top and another soil on bottom of a cuboid, extending vertically from the dam's bottom to the dam's surface, are used to model a zoned soil dam's clay core portion;

calculating erosion rates to soils using different formulae according to different soil classification system and different construction compaction efforts when the dam was built;

using headcut migration stage and lateral widening stage for one of the homogeneous cohesive soil dam, the homogeneous non-cohesive soil dam, and the zoned soil dam;

performing 3D slope stability analysis to a breach channel during the headcut migration stage along main flow direction in the breach channel, before the dam is breached through to its bottom; and performing 3D slope stability analysis to two sides of a breach channel during the lateral widening stage perpendicular to the main flow direction in the breach channel, after the dam has been breached through to its bottom;

checking local force equilibrium in the entire dam-breaching process and removing instable soil blocks;

wherein six points are used to define the phreatic surface in the zoned soil dam and/or the homogeneous soil dam;

wherein the dam can be breached by overtopping flow, by wind-generated wave overtopping, by piping flow, or by statistic liquefaction;

wherein the number of breaching locations can be one or more than one, and failure modes can be one of or combination among overtopping failure, piping failure, and liquefaction failure;

wherein in the overtopped failure mode, the dam can be breached by overtopping flow through a pilot channel on the dam crest, or can be breached by overtopping flow through leading headcut when the dam is overtopped everywhere along its crest;

wherein leading headcut is defined as the headcut that breaches an earthen dam at a location when the dam is overtopped everywhere along its crest, because that location either has the lowest crest elevation or the largest overtopping depth because of the combination of wave overtopping, or has the worst soil properties, or both, or because of any other unknown reasons and uncertainties;

presenting topographic information surrounding the dam by an outer two-dimensional (2D) Shallow Water Equations (SWE) domain that controls the boundary conditions which comprise one of the upstream inflow condition or the downstream outflow condition;

generating automatically a smaller layer of inner 2D SWE grids to cover the dam's breached portion and the breach channel area;

exchanging data of the outer 2D SWE grids and the inner 2D SWE grids at each time-step calculation, so that the inner 2D SWE grids' boundary conditions are controlled by the outer 2D SWE grids and the outer 2D SWE grids' data inside of the inner 2D SWE grids are controlled by the inner 2D SWE grids;

controlling the upstream and downstream conditions of normal flow, orifice flow, and 1D SWE by the outer 2D SWE grids when in used;

modeling elevations of the dam's crest and bottom and soil properties at different stations along the dam's centerline;

determining total breach outflow by combining of all breach outflows at all breach locations at each time step and presenting a three-dimensional final breach shape of the dam.

* * * * *